(12) United States Patent
Lestideau

(10) Patent No.: US 7,035,456 B2
(45) Date of Patent: Apr. 25, 2006

(54) FACE DETECTION IN COLOR IMAGES WITH COMPLEX BACKGROUND

(75) Inventor: Fabrice Lestideau, Naremburn (AU)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 10/157,825

(22) Filed: May 31, 2002

(65) Prior Publication Data

US 2003/0053685 A1     Mar. 20, 2003

(30) Foreign Application Priority Data

Jun. 1, 2001     (AU) ..................... PR5418

(51) Int. Cl.
  *G06K 9/00*     (2006.01)
(52) U.S. Cl. ..................... 382/164; 382/118
(58) Field of Classification Search ............... 382/115, 382/118, 162, 164, 173, 190, 195, 199, 203, 382/224, 225, 284, 272, 276
  See application file for complete search history.

(56) References Cited

U.S. PATENT DOCUMENTS

| | | | |
|---|---|---|---|
| 6,571,003 B1 * | 5/2003 | Hillebrand et al. ......... | 382/118 |
| 6,633,655 B1 * | 10/2003 | Hong et al. ................. | 382/118 |
| 6,697,502 B1 * | 2/2004 | Luo ............................ | 382/115 |
| 6,718,049 B1 * | 4/2004 | Pavlidis et al. .............. | 382/115 |
| 6,940,545 B1 * | 9/2005 | Ray et al. ................. | 348/222.1 |
| 6,959,099 B1 * | 10/2005 | Gutta et al. .................. | 382/100 |
| 2003/0053685 A1 * | 3/2003 | Lestideau .................... | 382/164 |

OTHER PUBLICATIONS

"Direct Least Square Fitting of Ellipses", Fitzgibbon, et al., IEEE Transactions on Pattern Analysis and Machine Intelligence, vol. 21, No. 5, May 1999, pp. 476-480.

Yow, Kin Choong and Cipolla, Robert, *Feature-Based Human Face Detection*, CUED/F-INFENG/TR 249, University of Cambridge, England (Aug. 1996).

(Continued)

*Primary Examiner*—Andrew W. Johns
*Assistant Examiner*—Amir Alavi
(74) *Attorney, Agent, or Firm*—Fitzpatrick, Cella, Harper & Scinto

(57) ABSTRACT

A method (100) of locating human faces, if present, in a cluttered scene captured on a digital image (105) is disclosed. The method (100) relies on a two step process, the first being the detection of segments with a high probability of being human skin in the color image (105), and to then determine a bounday box, or other boundary indication, to border each of those segments. The second step (140) is the analysis of features within each of those boundary boxes to determine which of the segments are likely to be a human face. As human skin is not highly textured, in order to detect segments with a high probability of being human skin, a binary texture map (121) is formed from the image (105), and segments having high texture are discarded.

15 Claims, 20 Drawing Sheets

OTHER PUBLICATIONS

Andrew W. Fitzgibbon, et al., "Direct Least Square Fitting of Ellipses", Department of Artificial Intelligence, University of Edinburgh (Jan. 4, 1996), pp. 1-15.

Kah-Kay Sung, et al., "Example-based Learning for View-based Human Face Detection", Massachusetts Institute of Technology, Artificial Intelligence Laboratory and Center for Biological and Computational Learning, A.I. Memo No. 1521, C.B.C.L. Paper No. 112, (Dec. 1994), pp. 1-20.

Bernd Menser, et al., "Segmentation and Tracking of Facial Regions in Color Image Sequences" (2000), pp. 1-10.

Jay P. Kapur, "Face Detection in Color Images", University of Washington Department of Electrical Engineering (1997), pp. 1-7.

Marc Antonini, et al., "Image Coding Using Wavelet Transform", *IEEE Transactions of Image Processing*, vol. 1, No. 2 (Apr. 1992), pp. 205-220.

Kin Choong Yow, et al., "Feature-Based Human Face Detection", *Image and Vision Computing*, vol. 15, No. 9 (1997), pp. 713-735 (renumbered as pp. 1-30).

Jean-Christophe Terrillon, et al., "Detection of Human Faces in Complex Scene Images by Use of a Skin Color Model and of Invariant Fourier-Mellin Moments", ICPR '98, IEEE (1998), pp. 1350-1355.

Bernd Menser, et al., "Segmentation of Human Faces in Color Images Using Connected Operators" (1999), pp. 1-5.

Nicholas J. Redding, et al.,"An Efficient Algorithm for Mumford-Shah segmentation and its application to SAR Imagery", Defence Science and Technology Organisation, Australia (1999), pp. 35-41.

G. Koepfler, et al., "A Multiscale Algorithm for Image Segmentation by Variational Method", *SIAM J. Numer. Numer. Anal.*, vol. 31, No. 1 (1994), pp. 282-299.

* cited by examiner

  
Fig. 4A  Fig. 4B  Fig. 4C
Fig. 4D

FACE DETECTION IN COLOR IMAGES WITH COMPLEX BACKGROUND

TECHNICAL FIELD OF THE INVENTION

The present invention relates generally to human face detection and, in particular, to locating human faces in colour images with complex background.

BACKGROUND ART

The location of a human face in an image with a complex background, which is generally referred to as face detection, is an important initial step in many processes, including face recognition. After a face has been located, computer vision may be used to analyse that face, for example to interpret facial-expressions, which may be used in various application areas. Such applications include the gathering of population and age-statistics of patrons at entertainment/amusement parks, as well as television network viewer-rating studies. Computer vision with this capability can further have application in such fields as automated security/surveillance systems, demographic studies, safety monitoring systems, human interfaces to computers, and automated photography.

A first category of face detection includes those approaches where a face is located by identification of facial features, such as the mouth and eyes. Once these features are identified, the overall location of the face may be determined using facial geometric information.

A second category of face detection includes those approaches where the face is examined as a whole, generally using model-based vision techniques. Typically, the head of a person can be modelled as an ellipse with a ratio of 1.2 to 1.4 between the two principal axes of such an ellipse. Typically, the fitting of the elliptic shape is performed after a skin colour detection step, thereby increasing the importance of segments in the image having the colour of skin. However, this technique is often not sufficient to detect faces because, on many instances, the neck and the face will be detected as a single segment, with the detected segment not having an elliptical shape. Further, the image may include objects that are elliptical in shape and which have the colour of human skin, without such objects being a human face.

Eigenfaces and neural networks have also been used for face detection. The image is typically divided into multiple, possibly overlapping, sub-images. At each sub image, attempts are made to classify the sub-image as being either "a face" or "not a face". This is done by attempting to match the sub-image with one of 4150 normalised canonical "face" patterns, which are used to synthesise six "face" pattern prototypes in a multi-dimensional image vector space. Such techniques have to deal with the difficult theoretical problem of how to define a non-face. Moreover, such techniques are not scale invariant, and do not cope with different viewpoints or orientation of included faces. These problems can make locating faces in an image an exhaustive process.

SUMMARY OF THE INVENTION

It is an object of the present invention to substantially overcome, or at least ameliorate, one or more disadvantages of existing arrangements.

According to a first aspect of the invention, there is provided a method of detecting one or more human faces in a colour image, said method comprising the steps of:

(a) forming human skin coloured segments in said colour image; and (b) determining for each segment whether said segment contains a face, said determining comprising the sub-steps of:

(b1) identifying features in said segment;

(b2) forming groups of said features; and (b3) for each group of said features, determine whether said group is bounded by contour lines in the shape of an ellipse, wherein only segments with at least one group of features bounded by contour lines in the shape of an ellipse contain a human face.

According to a second aspect of the invention, there is provided a method of detecting a human face in a colour image, said method comprising the steps of:

(a) determining a human skin segment in said colour image;

(b) generating texture information from the colour image;

(c) forming a group of facial features on the basis of said texture information and said segment; and (d) determining an ellipse for detecting said human face by using said group of facial features.

According to another aspect of the invention, there is provided an apparatus for implementing any of the aforementioned methods.

According to another aspect of the invention there is provided a computer program for implementing any of the methods described above.

Other aspects of the invention are also disclosed.

BRIEF DESCRIPTION OF THE DRAWINGS

A number of embodiments of the present invention will now be described with reference to the drawings, in which:

FIGS. 4A to 4C show examples of a first, second and third boundary maps;

FIG. 4D shows an example of a final boundary map;

DETAILED DESCRIPTION INCLUDING BEST MODE

Figure 1A:
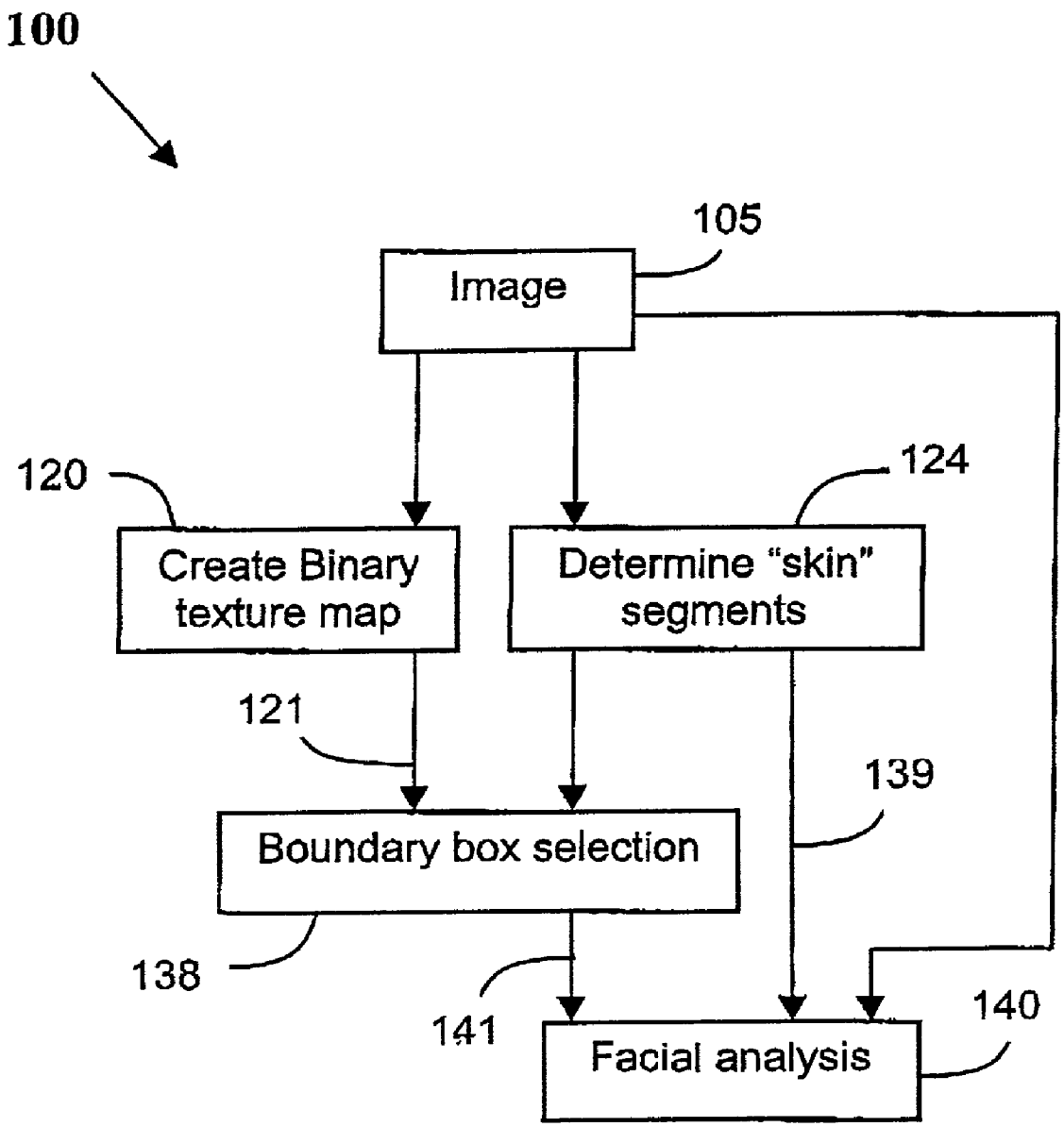
FIG. 1A is a flow diagram of a method of locating a human face in an image.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "calculating", "determining", "replacing", "generating", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also discloses a computer readable medium comprising a computer program for performing the operations of the methods. The computer readable medium is taken herein to include any transmission medium for communicating the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programing language and implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function(s) or operation(s), unless the contrary intention appears.

Figure 7:
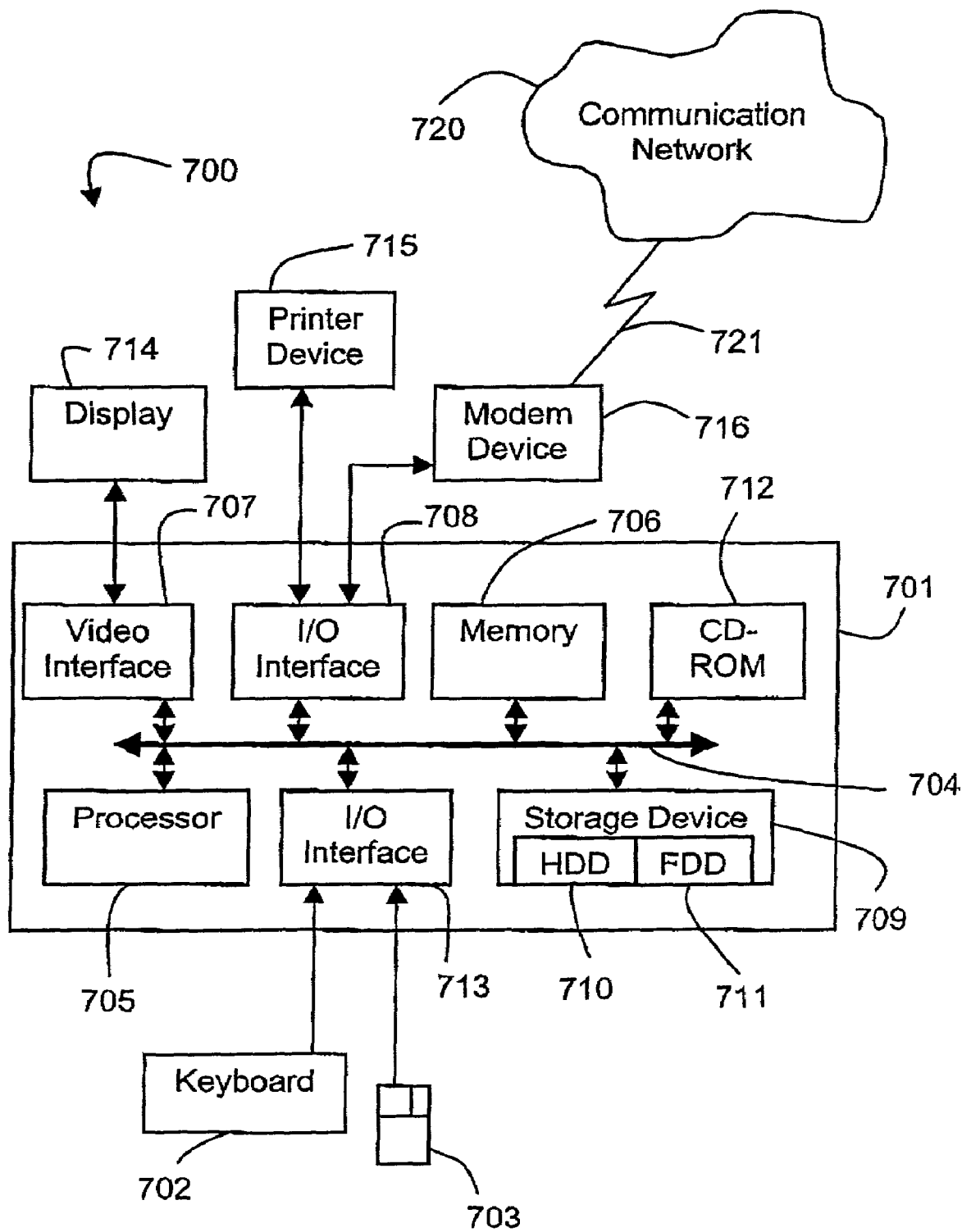
FIG. 7 is a schematic block diagram of a general purpose computer upon which arrangements described can be practiced.

FIG. 7 shows a computer system 700 which comprises a computer module 701, input devices such as a keyboard 702 and mouse 703, output devices including a printer 715 and a display device 714. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN).

The computer module 701 typically includes at least one processor unit 705, a memory unit 706, for example formed from semiconductor random access memory (RAM) and read only memory (ROM), input/output (I/O) interfaces including a video interface 707, and an I/O interface 713 for the keyboard 702 and mouse 703, and an interface 708 for the modem 716. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations or alike computer systems evolved therefrom.

FIG. 1A shows a flow diagram of a method 100 of locating human faces, if present, in a cluttered scene captured on a digital image 105, with the human faces having quasi-frontal views. The method 100 is preferably practiced using the general-purpose computer system 700 shown in FIG. 7 wherein the steps of the method 100 may be implemented as software, such as an application program. Typically, the application program is resident on the hard disk drive 710 and read and controlled in its execution by the processor 705. In particular, the steps of method 100 are effected by instructions in software that are carried out by the computer system 700. The software may be stored in a computer readable medium, including the storage devices 709 and 712 described above. The software is loaded into the computer from the computer readable medium, and then executed by the processor 705. A computer readable medium having such software or computer program recorded on it is a computer program product. The use of the computer program product in the computer preferably effects an advantageous apparatus for locating human faces in an image 105.

In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable medium including magnetic tape, a ROM or integrated circuit, a magneto-optical disk, a radio or infra-red transmission channel between the computer module 701 and another device, a computer readable card such as a PCMCIA card, and the Internet and Intranets including email transmissions and information recorded on websites and the like. The foregoing is merely exemplary of relevant computer readable mediums. Other computer readable media may alternately be used.

Intermediate storage of the program and any data fetched from the network 720 may be accomplished using the semiconductor memory 706, possibly in concert with the hard disk drive 710.

The method 100 may alternatively be implemented in dedicated hardware such as one or more integrated circuits performing the steps or sub steps of method 100. Such dedicated hardware may include graphic processors, digital signal processors, or one or more microprocessors and associated memories.

The digital image 105 may be obtained by scanning a photograph, or from a digitised video signal, and stored on the storage device 709. The method 100 relies on a two step process, the first being the detection of segments with a high probability of being human skin in the colour image 105, and to then determine a boundary box, or other boundary indication, to border each of those segments. The second step is the analysis of features within each of those boundary boxes to determine which of the segments are likely to be a human face As human skin is not highly textured, in order to detect segments with a high probability of being human skin, a step 120 creates a binary texture map 121 from the image 105. The binary texture map 121 is typically stored in memory 706. The binary texture map 121 represents high and low textured parts of the image 105. Any texture analysis technique may be used. Such texture analysis techniques include Gabor filters or the co-occurrence matrix technique.

Figure 1B:
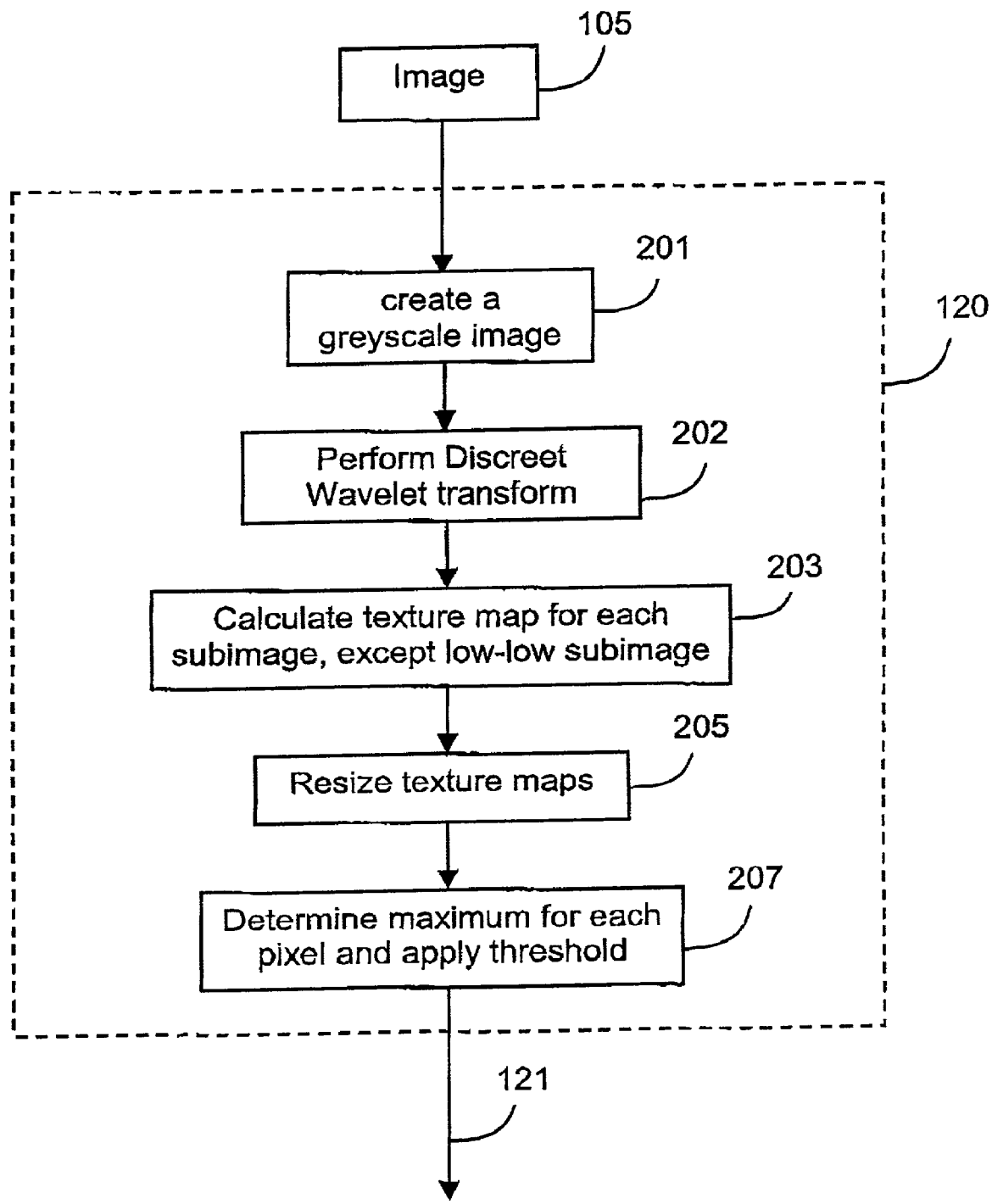
FIGS. 1B to 1H are more detailed flow diagrams of steps of the method shown in FIG. 1A.

FIG. 1B shows a flow diagram of a preferred texture analysis method 120 for creating the binary texture map 121. The preferred texture analysis method 120 uses a discrete wavelet transform to calculate the texture level locally on the colour image 105. In the preferred implementation, the JPEG 2000 discrete wavelet transform is used. In step 201 a grey scale image of image 105 is created and stored in memory 706. Next, using the grey scale image as input, a predetermined number of levels of the discrete wavelet transform is calculated and stored in memory 706 in step 202.

Figure 2A:
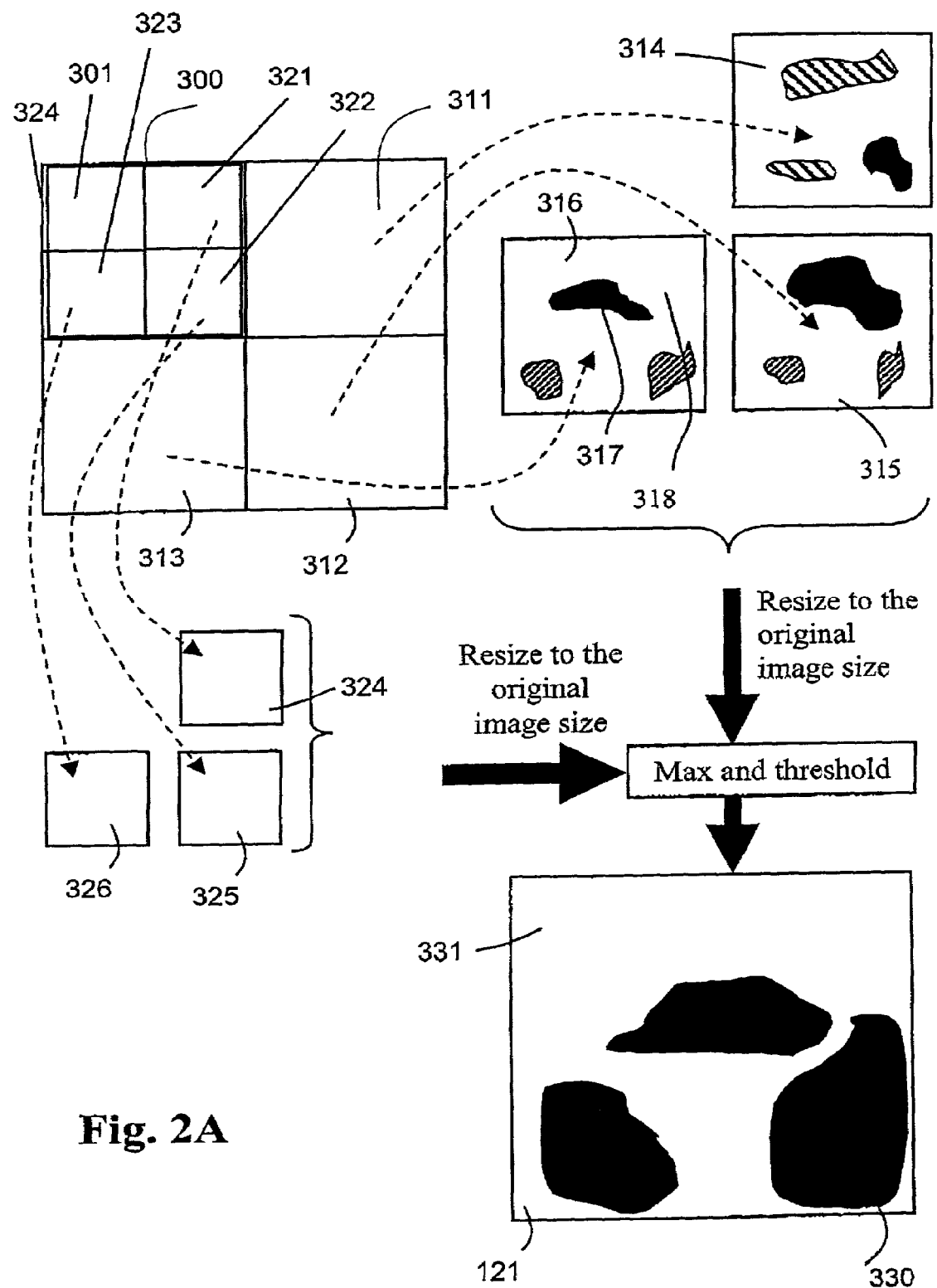
FIG. 2A shows an illustration of the creation of a binary texture map.

FIG. 2A shows diagrammatically the image decomposition 300 resulting from a two level wavelet transform. The first level wavelet transform forms three detail sub-images 311, 312 and 313, and a low-pass sub-image 324. The second level wavelet transform, which is performed on the low-pass said-image 324, forms three smaller detail sub-images 321, 322 and 323, and a smaller low-pass sub-image 301. In step 203 (FIG. 1B), a 3×3 pixel window is moved over each of the detail sub-images 311, 312, 313, 321, 322 and 323. At each window position, the variance of the intensity values is calculated from the pixels inside the 3×3 pixel window. New images 314, 315, 316, 324, 325 and 326 are formed with the pixels of those images having values representing the level of variance around the corresponding pixels of the detail sub-image 311, 312, 313, 321, 322 and 323. Accordingly, these images may be referred to as texture maps 314, 315, 316, 324, 325 and 326. As illustrated in texture map 316, dark areas 317 indicate areas of high variance, whereas light areas 318 indicate areas of low variance.

The texture maps 314, 315, 316, 324, 325 and 326 each have the same size as the corresponding detail sub-image 311, 312, 313, 321, 322 and 323 from which it is created. In step 205 (FIG. 1B) each texture map 314, 315, 316, 324, 325 and 326 is resized to the size of the input image 105.

Finally, in step 207 (FIG. 1B), the binary texture map 121 is created by choosing for each pixel, the maximum pixel value from each of the corresponding pixels in the texture maps 314, 315, 316, 324, 325 and 326. A threshold is applied to that maximum pixel value for determining whether the maximum pixel value of that pixel is above or below a predetermined value. In the preferred implementation, with a greyscale image having pixel intensity values between 0 and 255, the predetermined value is chosen to be 150. Areas in the binary texture map 121 that correspond to textured areas in the image 105, such as area 330 (FIG. 2A), is given a value of "1", whereas areas in the binary texture map 121 that correspond to substantially untextured areas in the image 105, such as area 331, is given a value of "0".

Another property of human skin is that the colour of human skin is distinctive from the colour of many other natural objects. Hence, skin colour is a feature that is used for face detection. By analyzing skin colour statistics, one observes that human skin colour is distributed over a small area in the chrominance plane. Referring again to FIG. 1A, a step 124 uses skin colour analysis to detect segments with a high probability of being skin.

Figure 1C:
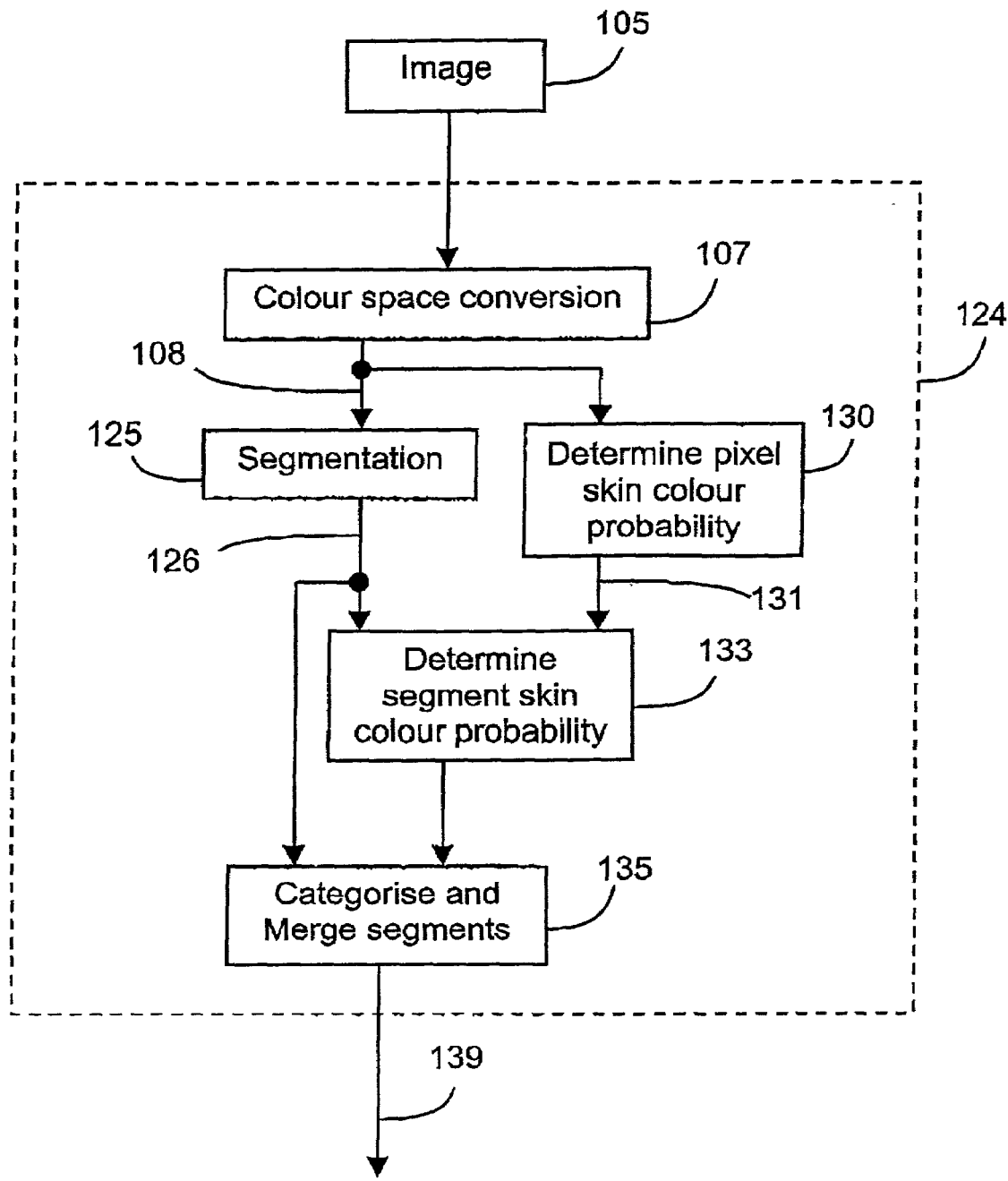

Step 124 is shown in more detail in FIG. 1C. Step 124 also uses image 105 as input. Because the image 105 is typically stored on the storage device 709 in the RGB colour space, which is not particularly suited for segmentation and human skin detection, the image 105 is converted into a predetermined colour space in step 107, to produce a defined colour space image 108. The defined colour space image 108 is also stored in the memory 706. The predetermined colour space may be CIE Luv, or a combination of colour spaces, which is more suited to segmentation and skin detection, thereby improving the quality of the segmentation step 125 and pixel skin colour probability determination step 130 that follows.

The defined colour space image 108 is over-segmented in step 125, creating a segmented image 126 having small segments of homogenous colour. Over-segmentation refer to a segmentation process wherein a large number of segments are allowed such that each segment is substantially uniform in colour. The defined colour space image 108 is over-segmented to ensure that a face or faces, if present in the image 105, is separated from the background and not merged with the background. Any image segmentation technique may be used to create the segmented image 126, which is stored in the memory 706.

In the preferred implementation, the so-called Mumford-Shah full-λ-schedule 2D segmentation algorithm is used. In its simplified model, the segmentation is obtained by minimising the cost functional:

$$E(u, K) = \int_{\Omega \setminus K} \|u - g\|^2 dx dy + \lambda l(K) \quad (1)$$

where K is a set of segment boundaries with total length l(K) defining the segmentation, g is a colour component vector of the image pixels in the chosen colour space domain Ω, u is the colour component vector of the segment bounded by boundary K, and λ is a regularization parameter. The first term in Equation (1) limits the error in colour approximation within a segment, whereas the regularization parameter λ controls the fineness of the segmentation by limiting the total boundary length l(K) of the segmentation.

The decision to merge an adjacent segment pair $(V_i, V_j)$ occurs when the regularization parameter $\lambda$ is higher or equal to a merging cost $t_{ij}$ given by:

$$t_{i,j} = \frac{\overline{E}_{ij} - (\overline{E}_i + \overline{E}_j)}{l(\partial(V_i, V_j))} \qquad (2)$$

The numerator in Equation (2) represents the increase in colour approximation error due to the merger of segment pair $(V_i, V_j)$, while the denominator represents the length of the common boundary $\partial(V_i, V_j)$ between segments $V_i$ and $V_j$. The numerator may be expressed as a simple area-weighted Euclidean distance as follows:

$$t_{i,j} = \frac{\frac{|V_i||V_j|}{|V_i|+|V_j|}\|u_i - u_j\|}{l(\partial(V_i, V_j))} \qquad (3)$$

where $|V_i|$ is the area of segment $V_i$ and $u_i$ is the mean of the colour component vectors g of the image pixels within segment $V_i$.

The full-$\lambda$-schedule segmentor iteratively performs a global search over all adjacent segment pairs $(V_i, V_j)$ for the smallest merging cost $t_{ij}$ and then merges the corresponding segments $V_i$ and $V_j$ if the merging cost $t_{ij}$ is below a predefined value.

Figure 1D:
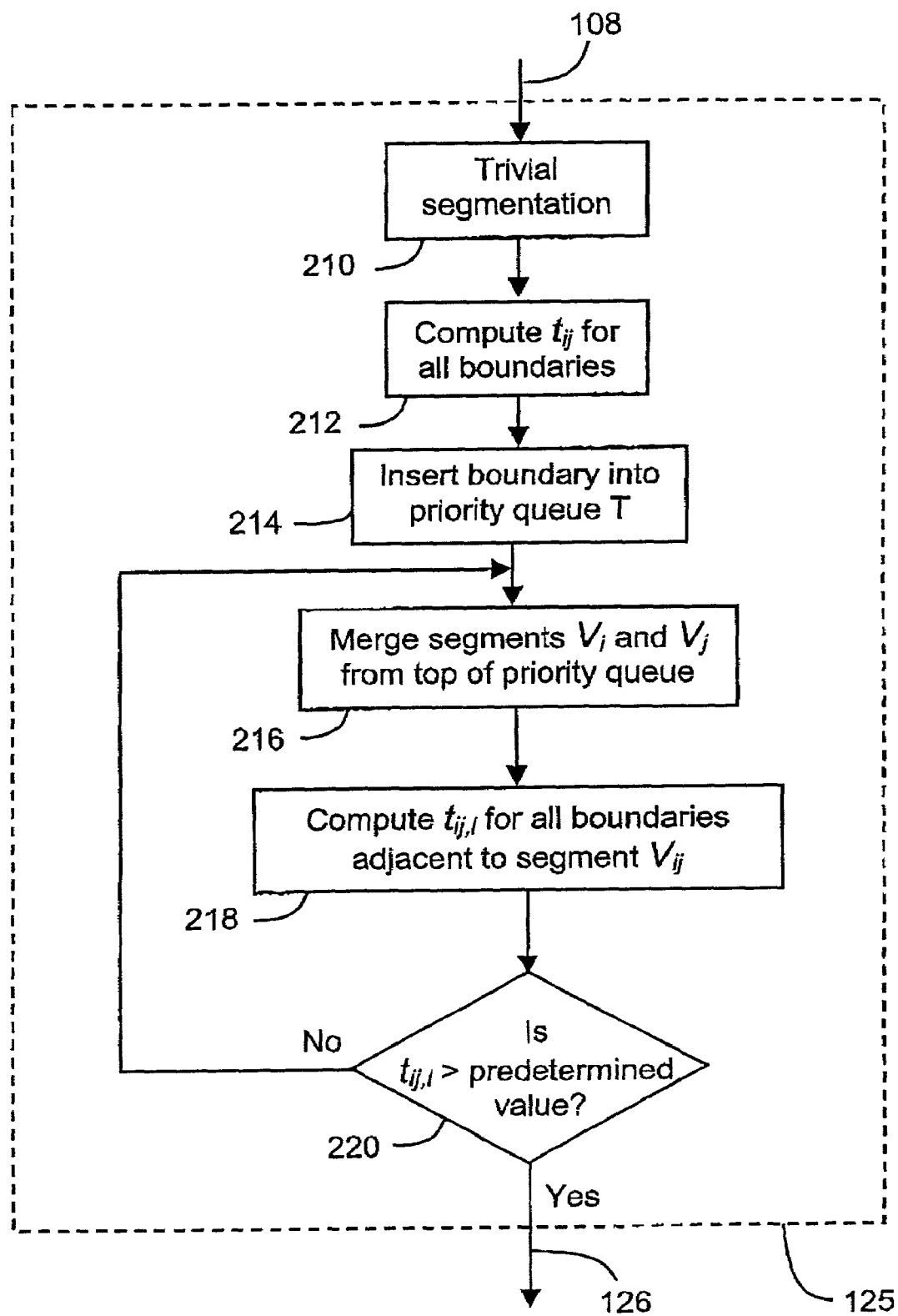

FIG. 1D shows the segmentation step 125 of the preferred implementation in more detail. The segmentation step 125 starts at step 210 with the trivial segmentation where each pixel represents a separate segment $V_i$. Step 212 then determines all adjacent segment pairs $V_i$ and $V_j$, and calculates the merging cost $t_{ij}$ according to Equation (3) for each of the boundaries between adjacent segment pairs $V_i$ and $V_j$. Step 214 inserts the boundaries with merging cost $t_{ij}$ into a priority queue T in priority order.

Step 216 takes the first entry from the priority queue T(1) and merges the corresponding segment pair $V_i$ and $V_j$ (i.e. the segment pair $V_i$ and $V_j$ with the lowest merging cost $t_{ij}$) to form a new segment $V_{ij}$, where the area of the new segment $V_{ij}$ is given by:

$$|V_{ij}| = |V_i||V_j| \qquad (4)$$

Step 218 follows by calculating a new merging cost $t_{ij,l}$ for each boundary between adjacent segments $V_{ij}$ and $V_l$, with $u_{ij}$ being the area-weighted average of segment colour components $u_i$ and $u_j$, i.e.:

$$u_{ij} = (u_i|V_i| + u_j|V_j|)/(|V_i| + |V_j|) \qquad (5)$$

The priority queue T is also updated. Step 220 determines if the merging has reached a predetermined stopping point. This is done by determining whether the merging cost $t_{ij}$ corresponding to the regions $V_i$ and $V_j$ at the top of the priority queue T (entry T(1)) has a value greater than a predetermined value. If the merging has reached the stopping point, then the segmentation step 125 ends. Alternatively, control is returned to step 216 and steps 216 to 220 are repeated, merging the two regions with the lowest merging cost $t_{ij}$ every cycle, until the stopping point is reached.

Referring again to FIG. 1C, a skin colour probability map 131 is created and stored in memory 706 by step 130 from the defined colour space image 108, with each pixel in the skin colour probability map 131 representing a probability of that pixel having colour of skin. This is done by calculating the Mahalanobis distance between the colour value of each pixel in the defined colour space image 108 and a predetermined skin colour model, followed by applying a membership function to the Mahalanobis distance of each pixel.

The predetermined skin colour model is created by extracting colour values from skin pixels from several images that contain faces. The colour values are converted into the same colour space as that of the second colour space image 108. A mean $\mu$ and covariance matrix $\Sigma$ of the converted colour values are calculated, thereby obtaining statistical measures representing those colour values.

It is noted that all or a sub-group of the components of the colour space may be used in step 130. For example, when using the CIE Luv colour space, all three Luv components may be use, or alternatively, the luminance L component may be ignored. The Mahalanobis distance $D_M(z_i)$ for each pixel i of the second colour space image 108 and having colour value $z_i$ is defined as:

$$D_M(z_i) = (z_i - \mu)\Sigma^{-1}(z_i - \mu) \qquad (6)$$

Values for the Mahalanobis distance $D_M(z_i)$ vary between zero and infinity. A membership function $Mf$ is used to transfer the Mahalanobis distance $D_M(z_i)$ to a probability as follows:

$$\begin{cases} Mf(D_M(z_i)) = 1 & \text{if} \quad D_M(z_i) \leq val1 \\ Mf(D_M(z_i)) = 0 & \text{if} \quad D_M(z_i) \geq val2 \\ Mf(D_M(V_i)) = \frac{D_M(z_i) - val2}{val1 - val2} & \text{if} \quad val1 < D_M(z_i) < val2 \end{cases} \qquad (7)$$

with val1 and val2 being predetermined values. In the preferred inmplementation the predetermined values are val1=2 and val2=2,5. Each pixel of the skin colour probability map 131 then represents the probability of the corresponding pixel in the image 105 being skin colour.

From the segmented image 126 and the skin colour probability map 131, a probability for each segment in the segmented image 126 of being a skin segment is determined in step 133. Known methods of determining the probability of a segment being a skin segment use the mean colour vector $u_i$ of segment $V_i$ and determine the probability of the mean colour vector $u_i$ being skin coloured. These methods may introduce errors, as the mean colour vector $u_i$ of a group of non-skin color pixels may be skin coloured. Therefore, the mean of the probabilities of the pixels of the segment $V_i$, available from the skin colour probability map 131, is calculated for each segment $V_i$ of the segmented image 126.

In step 135, segments $V_i$ are classified as "skin" or "non-skin" segments by applying a predetermined threshold to the skin probability of each segment $V_i$ in the segmented image 126. Adjacent segments, where each of the adjacent segments has the same classification, are also grouped. Any segment grouping technique may be used, but preferably, a connected component algorithm will be used. Non-skin segments are not taken into account in a later facial analysis step 140, as such segments are taken not to include any human faces. Accordingly, possible face segments 139 are produced as output of step 124.

Figure 2B:
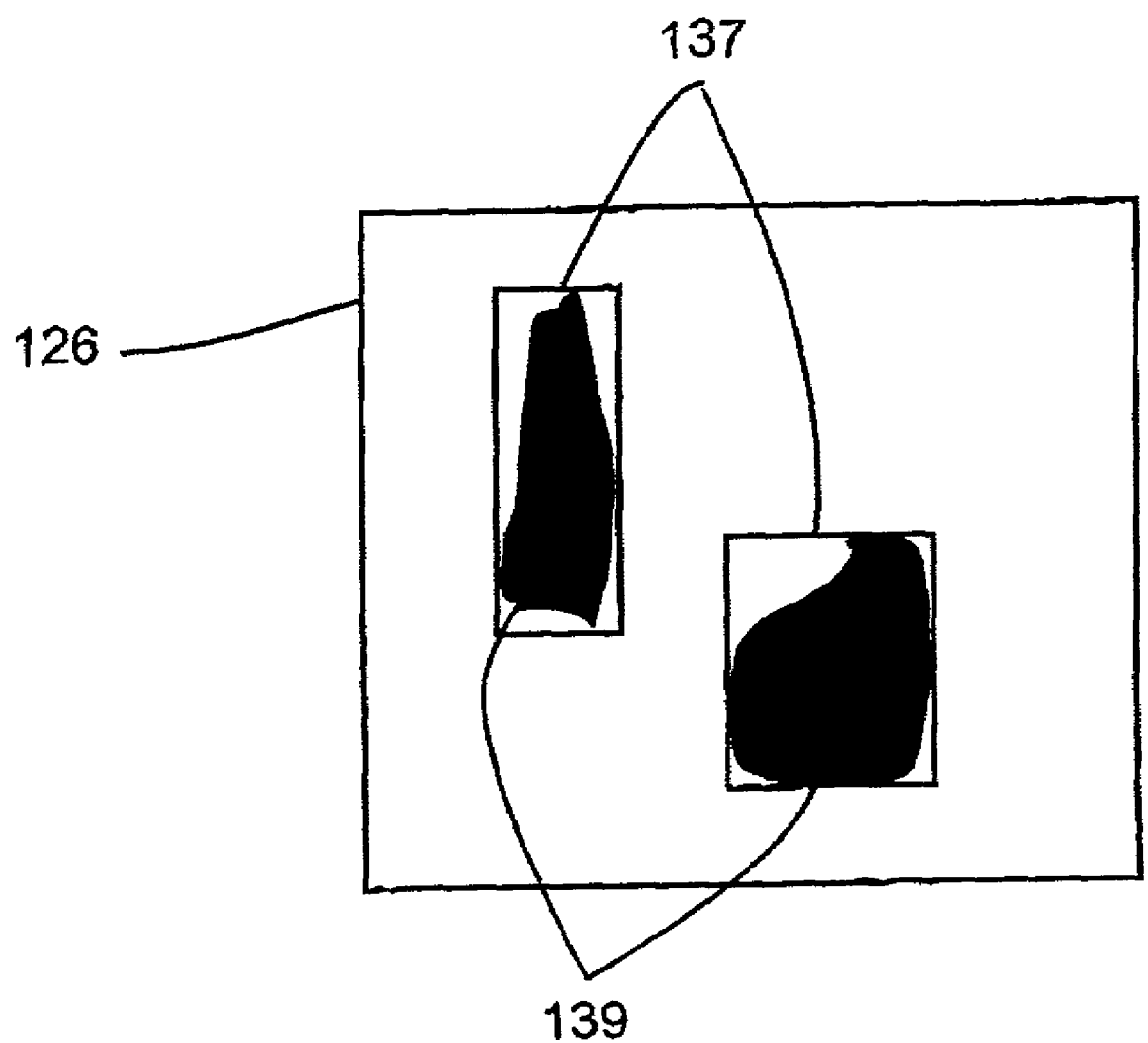
FIG. 2B shows all example segmented image with possible skin segments bounded by a boundary box.

Referring again to FIG. 1A, a boundary box, or other boundary indication, is determined in step 138 for each cluster of grouped "skin" segments. FIG. 2B shows an example segmented image 126 with possible skin segments 139 bounded by boundary boxes 137. As human skin has a smooth texture, those boundary boxes 137 leaving a high average texture value, calculated from the binary texture map 121, are eliminated and need not be processed in the later facial analysis step 140. In the preferred implementation, only those boundary boxes 137 having an average texture value below a threshold of 0.4 are analysed in subsequent steps.

Figure 1E:
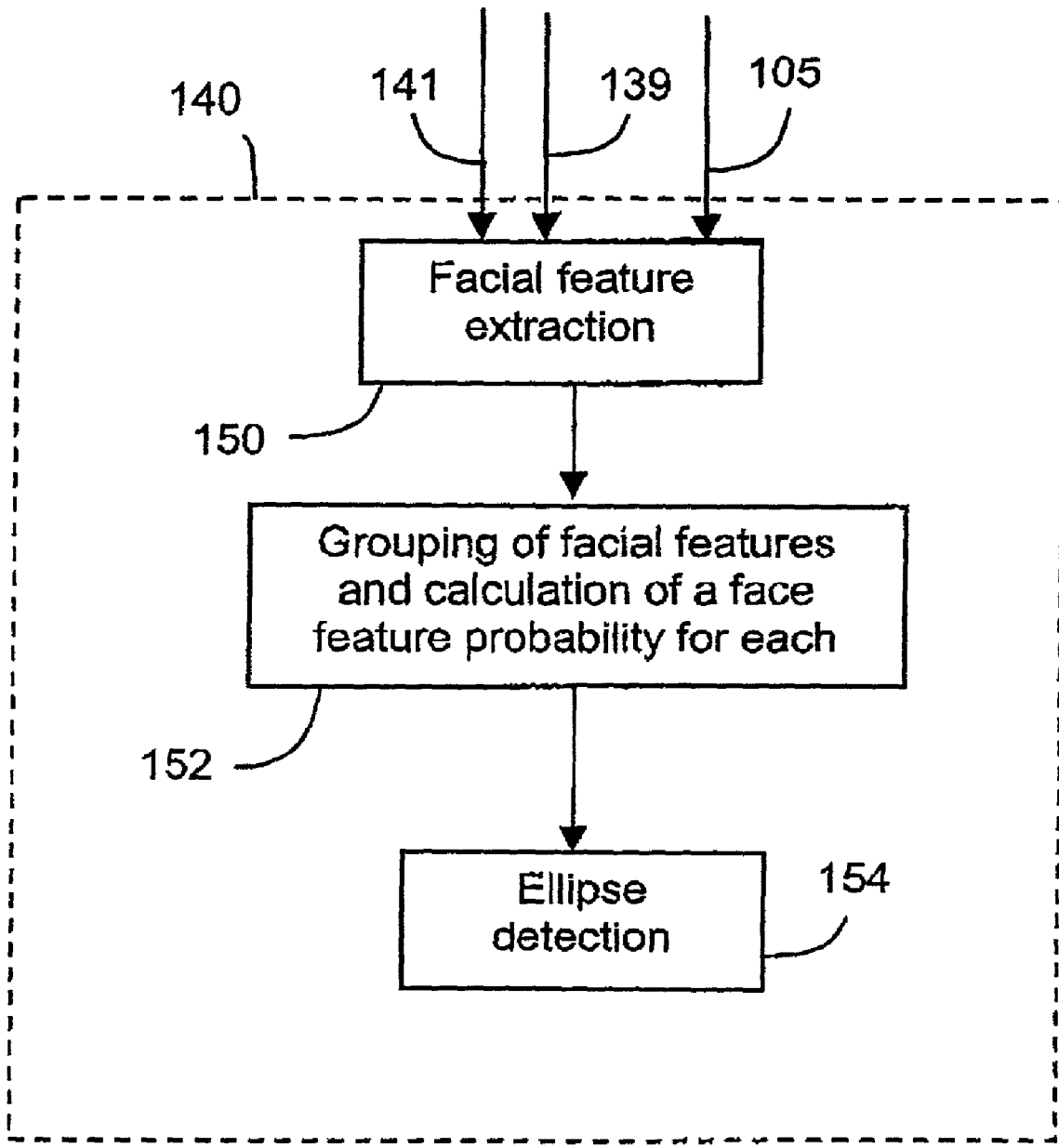

With the possible face segment 139 extracted from the rest of the image 105 and contained within the remaining boundary boxes 141, each of those segments are next separately subjected to facial analysis in step 140 to confirm that the segment contains a face. FIG. 1E shows the facial analysis step 140 in more detail. In step 150, facial features, which ideally includes the eyes and the mouth, are extracted. Those facial features are then grouped in step 152 in groups of three features, which are assumed to be two eyes and a mouth, and a probability is determined that those facial features are in fact the eyes and mouth of a face. Finally, using the grouped facial features, it is determined whether those facial features are bounded by lines in a shape of an ellipse by the ellipse detection step 154.

Figure 1F:
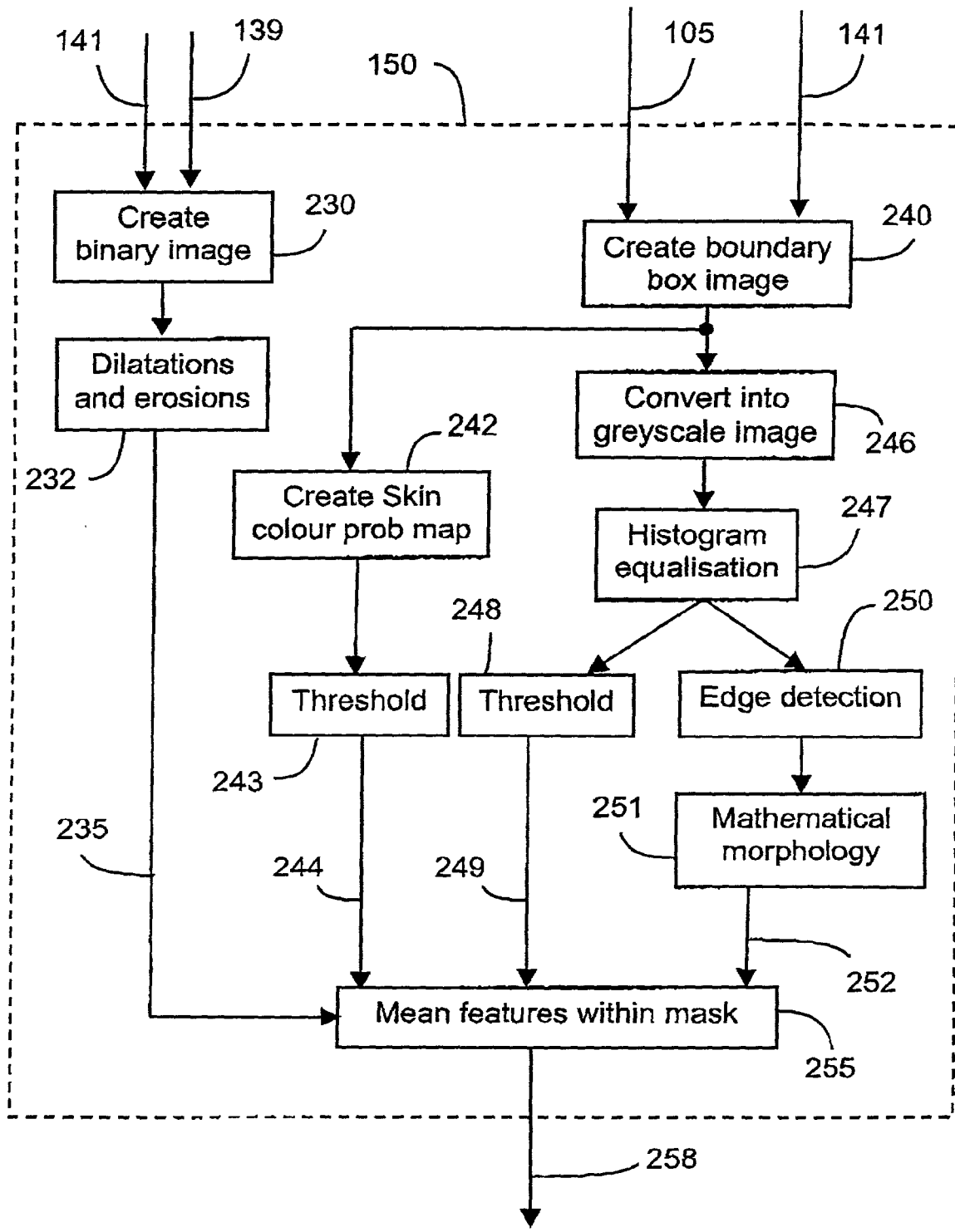
Figure 3A:
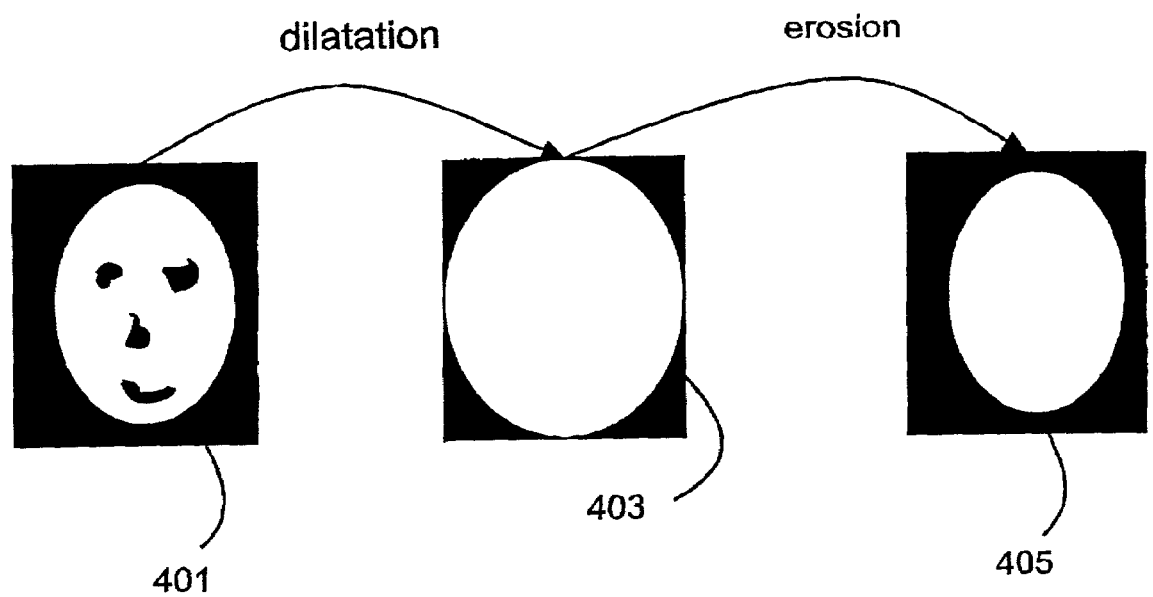
FIG. 3A shows an illustration of the creation of an example binary mask.

FIG. 1F shows the facial feature extraction step 150 in more detail. As true facial features, such as the eyes and mouth, are contained inside the possible face segment 139, a binary mask 235 is created in order to eliminate parts inside the bounding box 141 that are not inside the possible face segment 139 and that could therefore contribute to false face features. To create the mask 235, the image inside the boundary box 141 containing the possible face segment 139 is converted by step 230 to a binary image by assigning a value of "1" to the skin segments and "0" to non-skin segments. Several dilations followed by the same number of erosions are applied in step 232 to this binary image to close holes contained inside the possible face segment 139, thereby creating the binary mask 235. Dilations and erosions are operations known in the art. An example of these operations is shown in FIG. 3A where the binary image 401 is dilated to produce binary image 403, and then eroded to produce the example binary mask 405. In the preferred implementation, ten such dilations followed by ten erosions are performed, each using a binary structuring element as follows:

$$SE = \begin{bmatrix} 1 & 1 & 1 \\ 1 & 1 & 1 \\ 1 & 1 & 1 \end{bmatrix} \quad (8)$$

Face feature maps 244, 249 and 252 are created from each boundary box image, which is created in step 240 from the original image 105, and bounded by one of the boundary boxes 141 determined in step 138 (FIG. 1A).

Figure 3B:
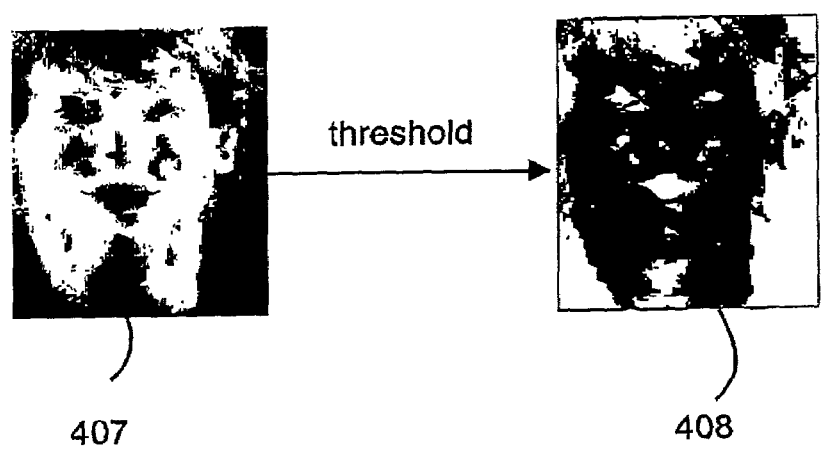
FIG. 3B shows an illustration of the creation of an example first feature map.

A skin colour probability map is created in step 242 from the boundary box image using a process similar to that described above in relation to step 130. An example skin colour probability map 407 is shown in FIG. 3B. To the skin colour probability map a threshold is applied in step 243, assigning a value "0" to pixels with a high probability of being skin and a value of "1" to pixels with a low probability of being skin, thereby creating the first face features map 244. An example first face feature map 408 created from the example skin colour probability map 407 is also shown in FIG. 3B. Blobs appear where the mouth and the eyes are locate as they don't have skin colour.

Figure 3C:
FIG. 3C is an example second feature map.

The boundary box image is also converted into a greyscale image in step 246 The greyscale image is also stored in memory 706, A histogram equalisation is realised in step 247, increasing the contrast between intensity levels of pixels. This cause the facial features to become darker, improving the effectiveness of an edge detection step 250 that follows. The second face features map 249 is created by applying a theshold in step 248 to the resulting image of the histogram equalisation step 247, giving a value of "1" to pixels with intensity values lower than a predetermined value and a value of "0" to pixels with intensity values above the predetermined value. Blobs appear where the pixels of the image have an intensity value lower than the threshold. FIG. 3C shows an example second face feature map. The blobs in the second face feature map 249 correspond to the eyes and the mouth, as those facial features are usually darker than the rest of the face.

Figure 3D:
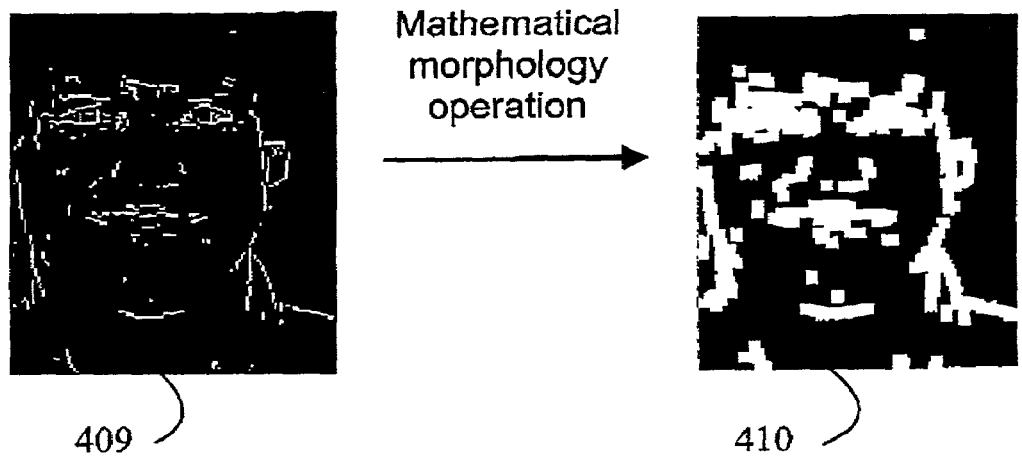
FIG. 3D shows an illustration of the creation of an example third feature map.

In step 250, edge detection is applied to the image created by the histogram equalisation step 247. Any edge detection technique may be used, but in the preferred implementation the Prewitt edge detection technique, as known in the art, is used. FIG. 3D shows an example output image 409 of the edge detection step 250. A dilation (mathematical morphology) is applied in step 251 on the result of the edge detection step 250 to create compact blobs and to enlarge the edges to create the third face feature map 252. FIG. 3D also shows an example third face feature map 410 created from the example output image 409.

A final face feature map 258 is formed in step 255 by calculating a mean of the three face feature maps 244, 249 and 252 within the binary mask 235. The final face feature map is the output of the facial feature extraction step 150.

Figure 1G:
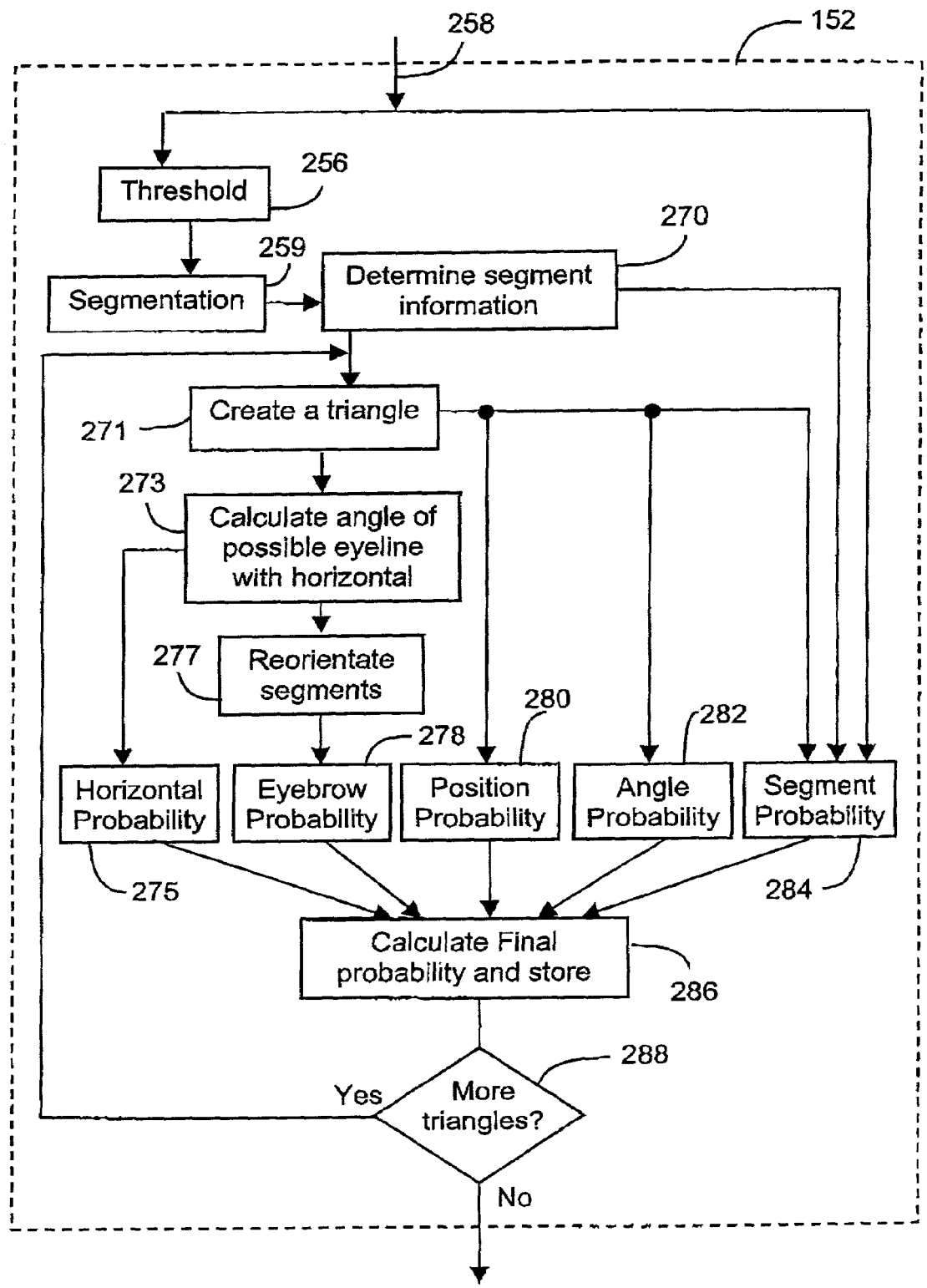

Proceeding to step 152 (FIG. 1E), which is shown in more detail in FIG. 1G, a threshold, such as ⅔, is applied to the final face feature map 258 in step 256. This creates blobs, with those blobs ideally representing the eyes and the mouth. However, this image may contain blobs that are not the eyes and the mouth, with those blobs adding some errors. Accordingly, a selection is required to determine which of the "blobs" inside the final face feature map 258 have a high probability of corresponding to the eyes and the mouth.

Figure 3E:
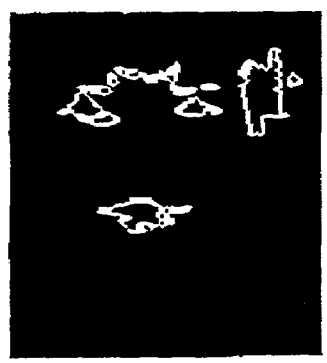
FIG. 3E shows the boundaries of segments in an example final feature map.

A segmentation step 259 follows the threshold step 256 to create a segmented final face feature map. The boundaries of an example segmented final face feature map is shown in FIG. 3E. The segmentation step 259 may be the same as that used in step 125 described above.

In step 270, information is extracted and stored in memory 706 for each segment in the segmented face feature map. Each segment represents one facial feature. In step 271, a triangle is created from three of these facial features. For each such triangle, a probability is determined that the triangle under consideration includes the true facial features of two eyes and a mouth.

Figure 3F:
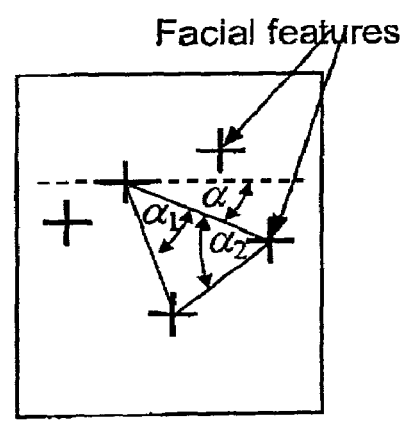
FIG. 3F shows an example of a triangle formed between three of the facial features and the angle that the uppermost line of the triangle makes with the horizontal.

The angle α that the uppermost line of the triangle makes with the horizontal is determined in step 273. FIG. 3F shows an example of the triangle formed between three of the facial features and the angle α that the uppermost line of the triangle makes with the horizontal This line is assumed to be the eyeline of the facial features represented by the triangle. A probability of being horizontal $P_1$ is determined from this angle α for the triangle as follows:

$$P_1 = e^{-2\alpha^2} \quad (9)$$

Using the angle α, the positions of all facial features are recalculated in step 277 in order to have the possible eyeline of the triangle under consideration horizontal. In step 278 an eyebrow probability $P_2$ is then calculated for the two facial features assumed to be the eyes, by determining whether there is another facial feature situated within a window above the possible eye facial feature. As eyebrows have similar properties to that of eyes, the eyebrow probability $P_2$ of a facial feature which is an eye, would be higher than that of a eyebrow. Let d be the distance between the two possible eyes (or length of eyeline), and $\xi_i$ the vector joining the possible eye facial feature j and a facial feature i above it. The eyebrow probability $P_2$ may then be calculated for each possible eye as follows:

$$P_{2j} = \begin{cases} 1 & \text{if} \quad \xi_{ix} < \frac{d}{5} \,\&\, |\xi_{iy}| < \frac{2*d}{5} \\ 0 & \text{else} \end{cases} \quad (10)$$

with $\xi_{ix}$ being the vertical component of the vector $\xi_i$ and $\xi_{iy}$ being the horizontal component of the vector $\xi_i$. This test is repeated for each facial feature i above a possible eye facial feature j, and a probability of one is given to the eyebrow probability $P_{2j}$ of facial feature j if at least one facial feature i gives a probability of one.

The eyebrow probability for the triangle is given by:

$$P_2 = \frac{1}{2}\sum_{j=1}^{2} P_{2j} \quad (11)$$

Considering the angles $\alpha_1$ and $\alpha_2$ formed at the possible eye facial features of the triangle, experimental results have shown that these angles $\alpha_1$ and $\alpha_2$ range between 0.7 and 1.4 radians for triangles of real faces. These angles $\alpha_1$ and $\alpha_2$ are shown in FIG. 3F. An angle probability $P_3$ is determined in step 282 from the angles $\alpha_1$ and $\alpha_2$ of the triangle as follows:

$$P_{\alpha j}(\alpha_j) = \begin{cases} 0 & \text{if} \quad \alpha_j \leq 0.5 \,\&\, 1.7 \leq \alpha_j \\ 2.5*\alpha_j - 1.25 & \text{if} \quad 0.5 < \alpha_j < 0.9 \\ -2.5*\alpha_j + 4.25 & \text{if} \quad 1.3 < \alpha_j < 1.7 \\ 1 & \text{if} \quad 0.9 < \alpha_j < 1.3 \end{cases} \quad (12)$$

$$\text{with} \quad P_3 = \frac{P_{\alpha 1} + P_{\alpha 2}}{2} \quad (13)$$

In perfect conditions, a feature should be detected in each of the three face feature maps 244, 249 and 252 (FIG. 1F). Therefore, the mean of the three face feature maps 244, 249 and 252, which was determined in step 255 as the final face feature map 258, provides another measure of the facial features of the triangle to be true facial features. Therefore the probability $P_4$ calculated in step 284 is given by:

$$P_{4j} = \frac{1}{N_j}\sum_{i=1}^{N_j} x_i \quad (14)$$

and $$P_4 = \frac{1}{3}\sum_{j=1}^{3} P_{4j} \quad (15)$$

$N_j$: number of pixels in the facial feature segment j.

$x_i$: grey value of pixel i of facial feature j from the final facial feature map 258

The relative position of the triangle inside the bounding box 141 will give position probability $P_5$, which is calculated in step 280. Experimental results have shown that the eyes are most often situated at the top of the boundary box 141. Position probability $P_5$ takes into consideration the position of the highest of the possible eyes in probability $P_{51}$ and the distance between the possible eyes in relation to the width of the boundary box in probability $P_{52}$.

$$P_{51} = \begin{cases} 1 & \text{if} \quad X_c < \frac{2*L}{3} \\ -\frac{3*X_c}{L} + 3 & \text{elsewhere} \end{cases} \quad (16)$$

$$P_{52} = \begin{cases} 1 & \text{if} \quad e < \frac{L}{2} \,\&\, e > \frac{L}{4} \\ \frac{-4*e}{L} + 3 & \text{if} \quad e > \frac{L}{2} \,\&\, e < \frac{3*L}{4} \\ \frac{4*e}{L} & \text{if} \quad e < \frac{L}{4} \\ 0 & \text{else} \end{cases} \quad (17)$$

$$P_5 = \frac{P_{51} + P_{52}}{2} \quad (18)$$

with $X_c$ is the x-axis coordinate of the highest possible eye facial feature of the triangle;

L is the width of the boundary box 141; and e is the distance between the two possible eye facial features.

The probability P of a triangle to be a true facial feature triangle is calculated and stored in step 286, and is given by:

$$P = \sum_{i=1}^{5} \pi_i * P_i \quad (18)$$

with $\pi_i$ being predetermined probability weight factors $$\left(\sum_i \pi_i = 1\right)$$

In the preferred implementation, the predetermined probability weight factors are $\pi_1=0.2$, $\pi_2=0.1$, $\pi_3=0.1$, $\pi_4=0.5$, and $\pi_5=0.1$.

Step 288 determines whether there are more triangles to be considered. If there are more triangles, a probability P of the next triangle to be a feature triangle is determined by repeating steps 271 to 286 for the next triangle. Alternatively, step 152 ends.

Figure 1H:
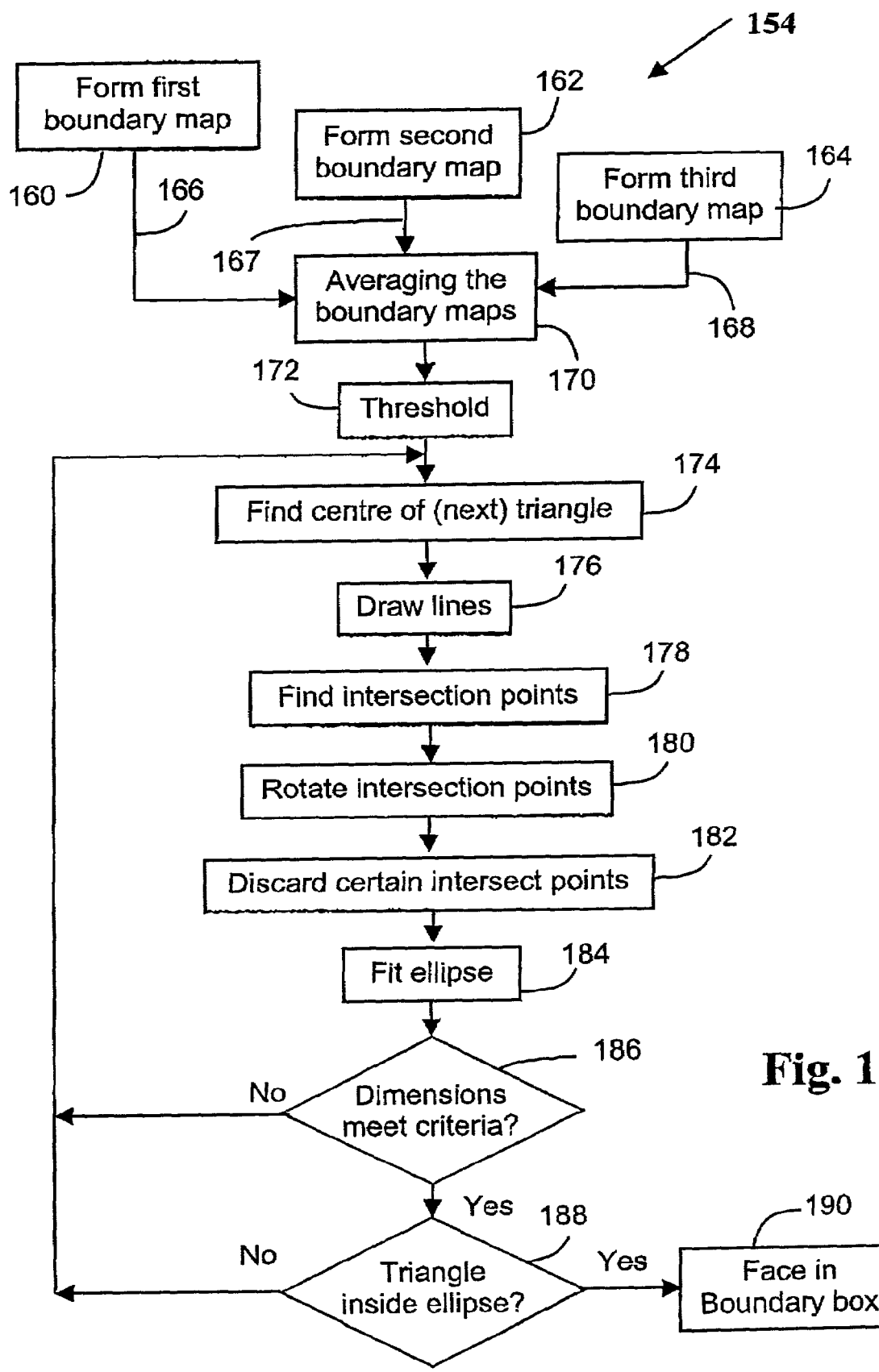

Step 154 follows step 152 by determining whether one of the feature triangles is bounded by an elliptical contour. FIG. 1H shows step 154 in more detail. In order to detect the boundary of the possible face, three boundary maps 166, 167 and 168 are created and stored in memory 706 in steps 160, 162 and 164. The first boundary map 166 is formed by firstly forming an image by applying the bounding box 141 to the defined colour space image 108 and then performing a segmentation to that image. An example of the boundary lines formed by the segmentation of such an image is shown in FIG. 4A.

The second boundary map 167 is formed by applying an edge detector on the image 105 bounded by the bounding box 141. An example of a second boundary map 167 is shown in FIG. 4B.

The third boundary map 168 is formed by applying an edge detector on the first face feature map 244 (FIG. 1F). An example of a third boundary map 168 is shown in FIG. 4C. Preferably, a Gaussian filter with a large variance (such as 3) is used as edge detector, thereby obtaining large contours on these two boundary maps 167 and 168.

Figure 5A:
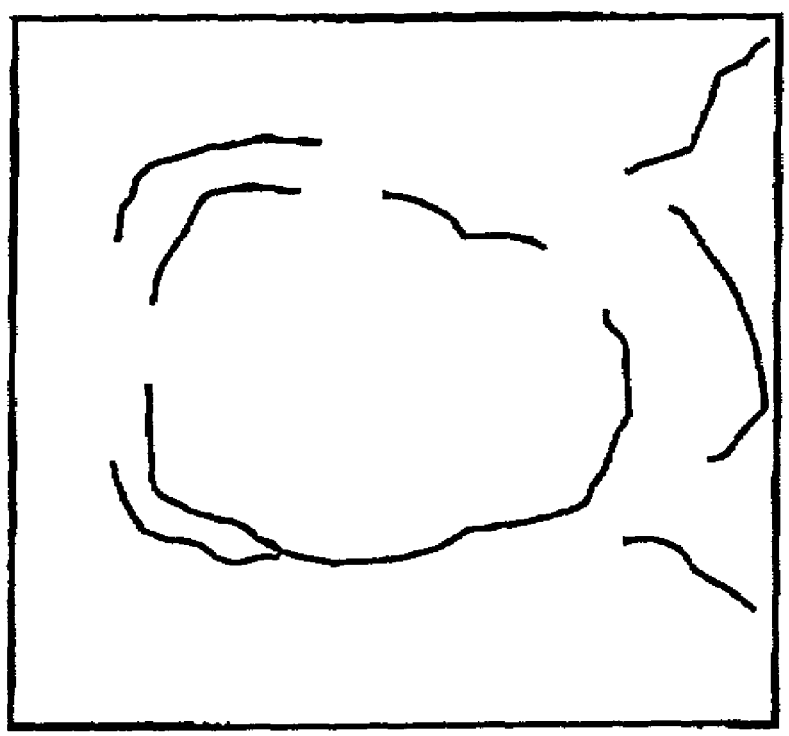
FIG. 5A shows facial contours.

Each of the three boundary maps 166, 167 and 168 gives some parts of the contour of the possible face. Accordingly, the three boundary maps 166, 167 and 168 are averaged in step 170 to form a final boundary map, an example of which is shown in FIG. 4D. By applying a threshold to the final boundary map in step 172, only boundaries appearing in a majority of the three boundary maps 166, 167 and 168 are retained. An example of the output from step 172 is shown in FIG. 5A. Many "false" facial contours remain such as the contours of the hair.

Figures 5B, 5C:
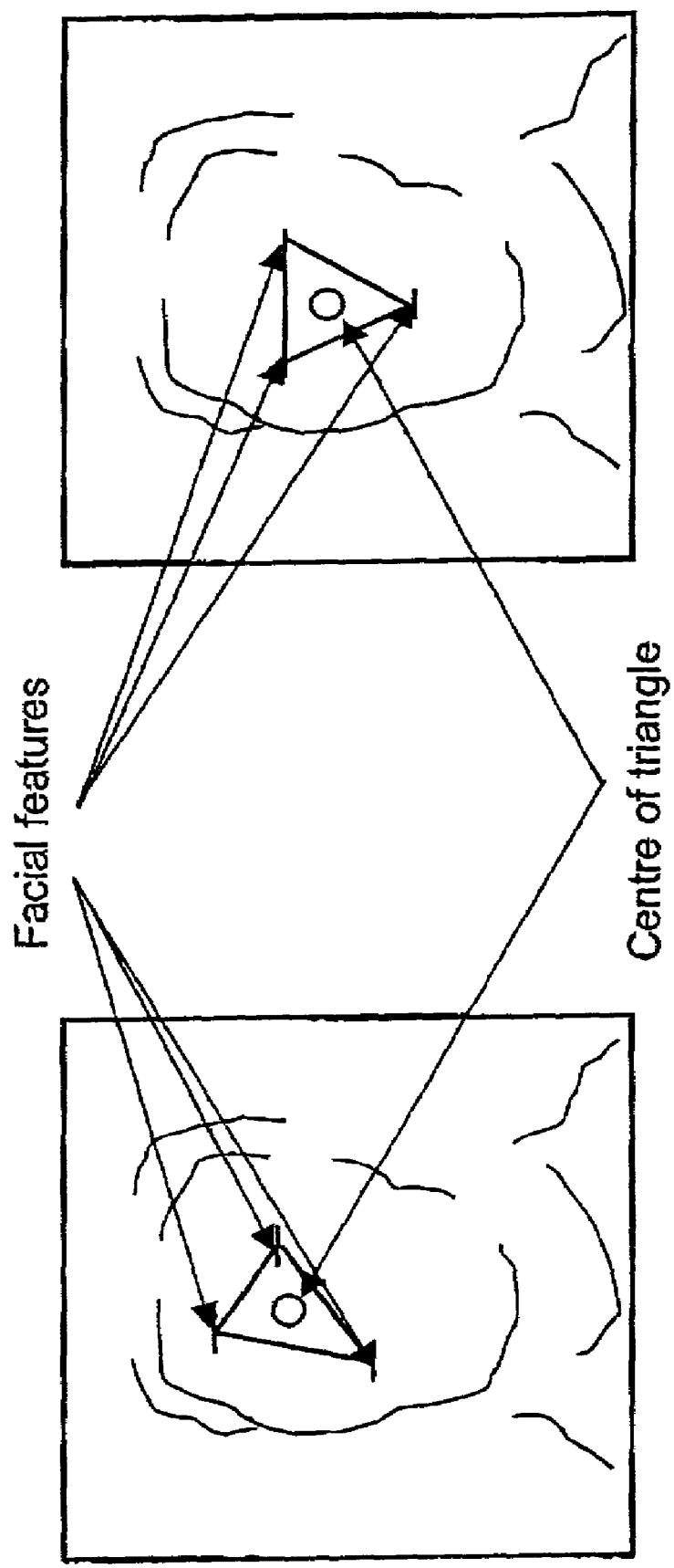
FIGS. 5B and 5C show examples of centre points of facial feature triangles having the highest and second highest probabilities of being a true facial feature triangle.

Step 174 follows by, for a next facial feature triangle and starting with the facial feature triangle with the highest probability P of being a true facial feature triangle, finding the centre point of the facial feature triangle. FIGS. 5B and 5C show example images including the centre points of the facial feature triangles having the highest and second highest probabilities P of being a true facial feature triangle.

Figure 5D:
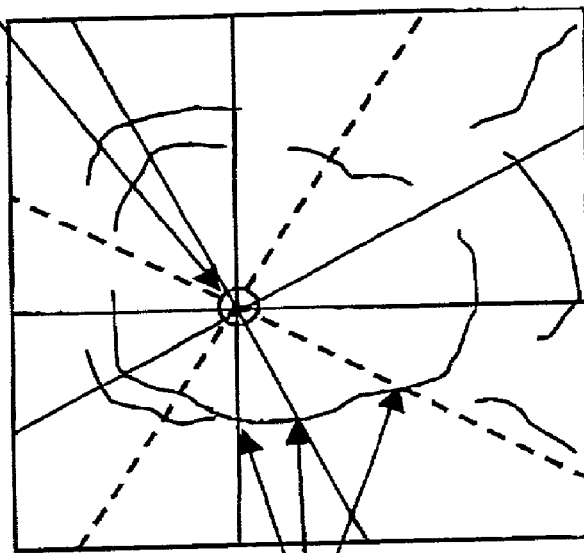
FIGS. 5D and 5E show equi-angled lines added through the centre of the triangles, and their intersection points with contour lines.
Figure 5E:
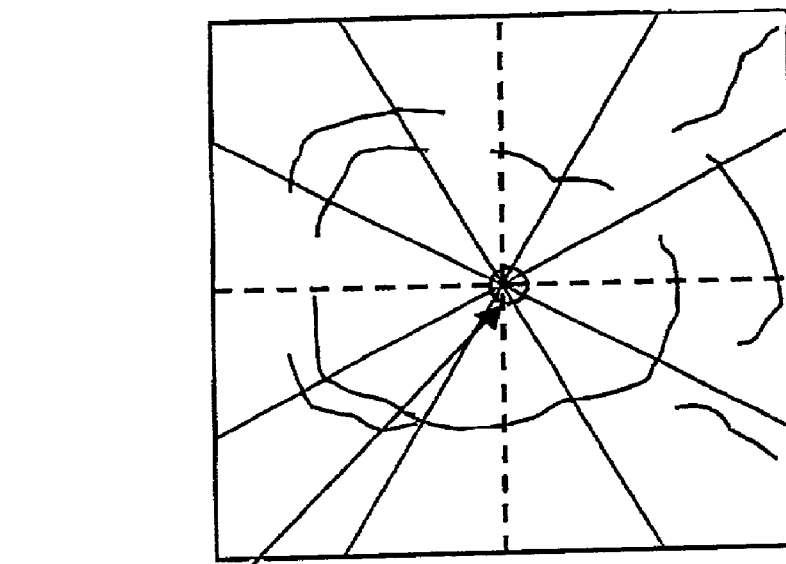

To extract points that belong to the contour of the possible face, Nl equi-angled lines are drawn in step 176, with each line passing through the centre point of the facial feature triangle. Step 178 then finds the intersection between the equi-angled lines and the contours in the final boundary map to which the threshold was applied in step 172. FIGS. 5D and 5E shows the lines and their intersection points with the contours for the two most probable facial feature triangles The intersection points are rotated by an angle α around the centre of the facial feature triangle in step 180, hereby rotating the possible eyeline to horizontal. This allows for a vertical ellipse to be fitted in a later step.

Figure 6A:
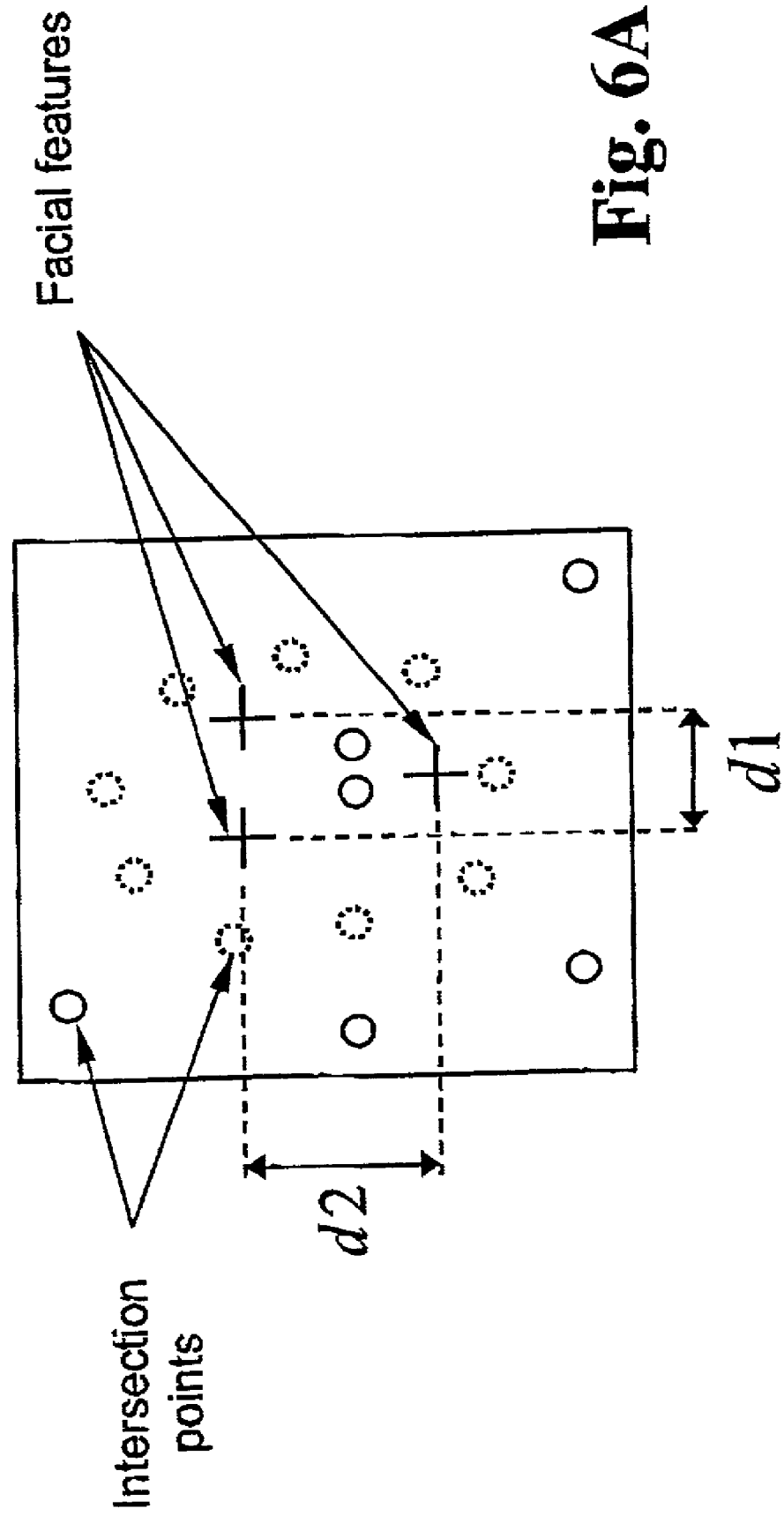
FIG. 6A shows the definition of distances d1 and d2.
Figure 6B:
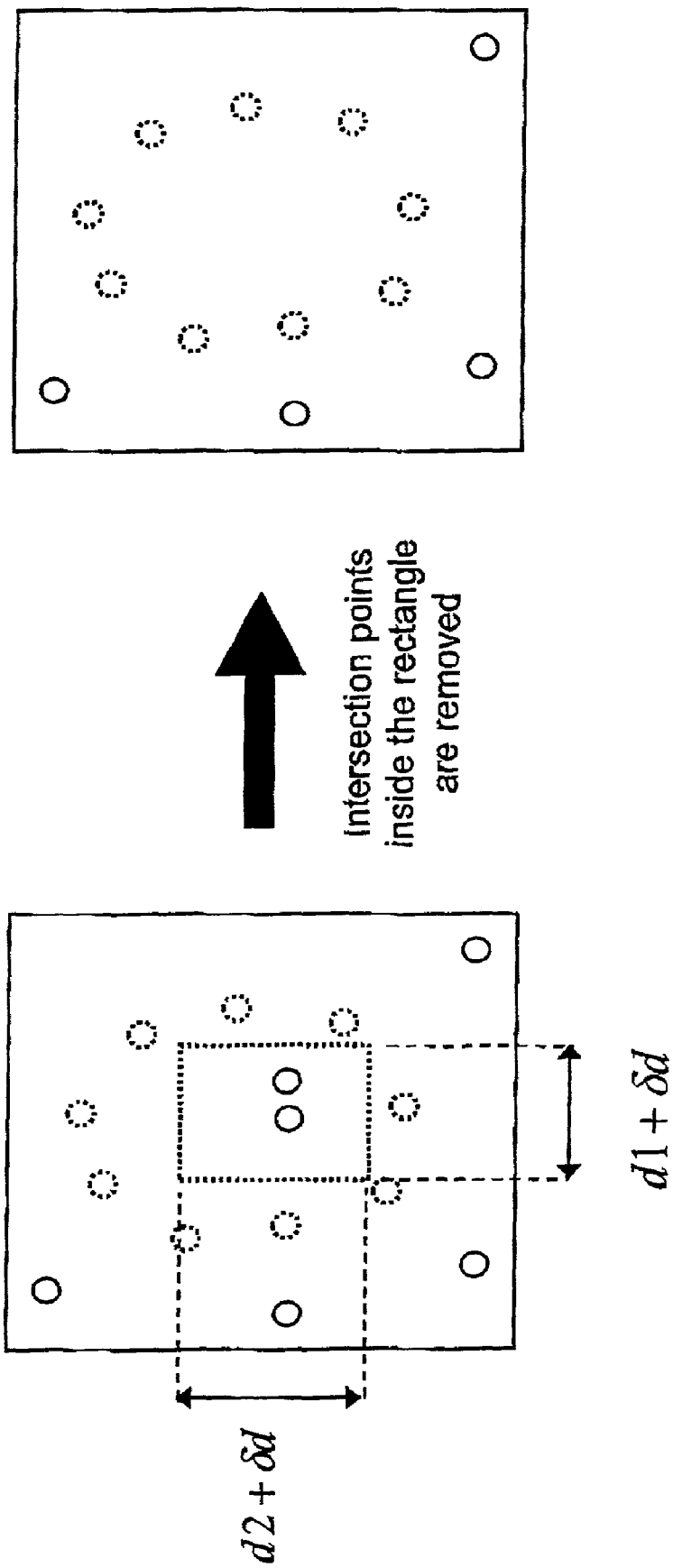
FIGS. 6B and 6C show the discarding of intersection points inside and outside of two constructed rectangles.
Figure 6C:
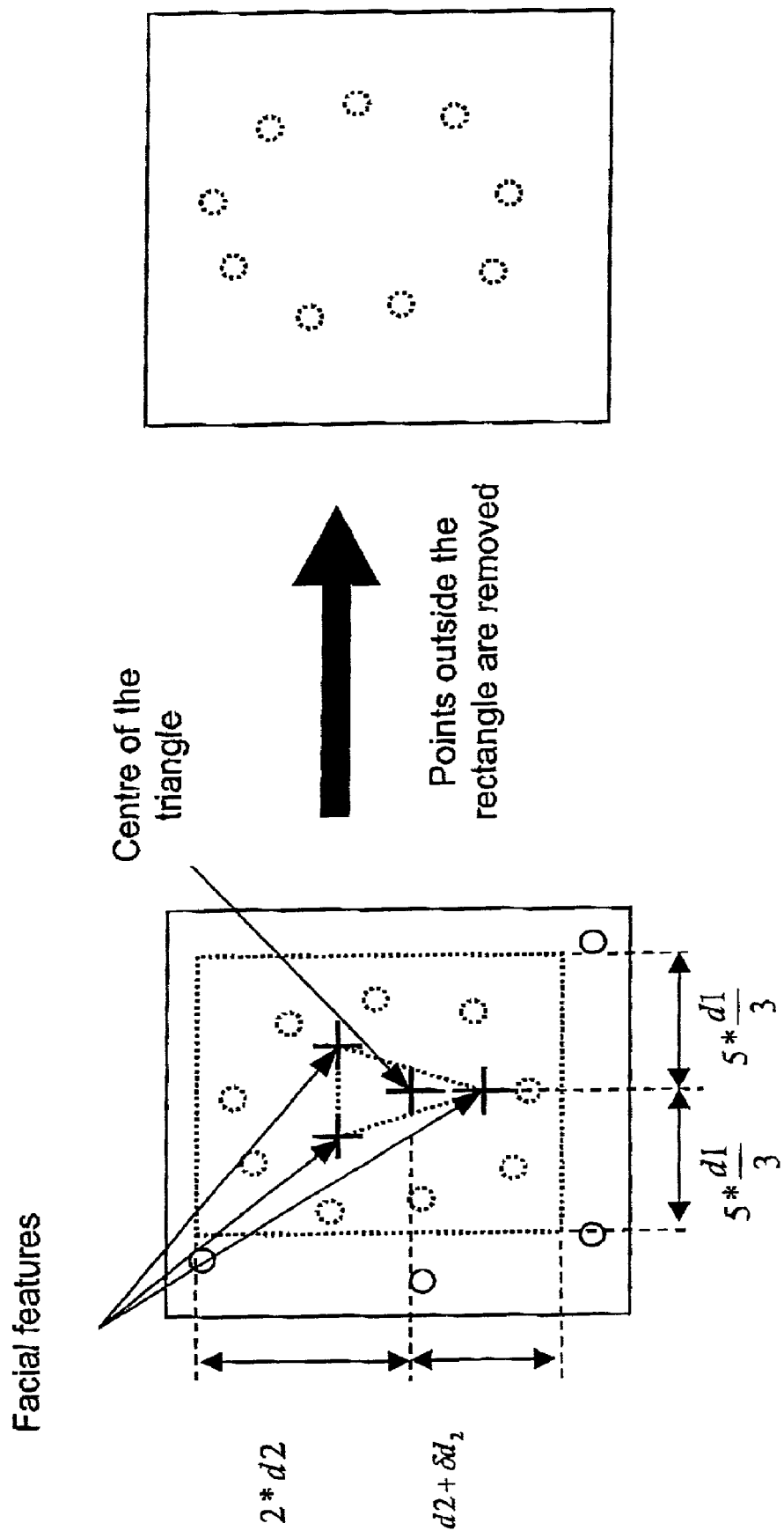

Step 182 follows which discard certain of the intersection points. Let d1 be the distance between the possible eyes, d2 the distance between the eyeline and the possible mouth, and δd and δd$_2$ two small distances, and C=(cx, cy) the centre of the triangle. Distances d1 and d2, together with intersection points for an example are shown in FIG. 6A. All the intersection points situated inside the rectangle centred on the centre C, and with a width of d1+δd and a height of d2+δd are discarded. This is illustrated in FIG. 6B. Furthermore, all the intersection points situated above cy+2*d2 and under cy−d2−δd$_2$ are removed. Finally, the points situated to the right of $$cx + 5 * \frac{d1}{3}$$

and to the left of $$cx - 5 * \frac{d1}{3}$$

are also discarded. This is illustrated in FIG. 6C.

A "direct least square" fitting of an ellipse is applied on the remaining intersection points. Such a technique is described in Andrew W, Fitzgibbon, Maurizio Pilu, and Robert B. Fisher. *"Direct least square fitting of ellipses"*. Department of Artificial Intelligence, The University of Edinburgh Scotland. Jan. 4, 1996, and may be used. A vertical ellipse is detected by estimating the parameters in the following equation:

$$Ax^2+Cy^2+Dx+Ey+F=1 \quad (19)$$

In step 186 it is determined whether the dimensions of the ellipse meet the following criterion:

$$1.0 < \frac{height}{width} < 1.7 \quad (20)$$

It is noted that Equation (20) allows for a circle.

If the ellipse does not meet that criterion, the method continues to step 174 from where steps 174 to 186 are repeated for the next most probable facial feature triangle. If that criterion is met the method continues to step 188 where it is determined whether the triangle under consideration is contained inside the ellipse. If at least one of the features of the triangle is outside the ellipse, then the method continues to step 174 from where steps 174 to 186 are repeated for the next most probable facial feature triangle. If the triangle is inside the ellipse, then the method ends in step 190 and the boundary box 141 is classified as containing a face.

If all the facial feature triangles are processed by applying steps 174 to 188 without finding a facial feature triangle for which the conditions of steps 186 and 188 are met, then the boundary box 141 contains no face. In the preferred implementation, only the three most probable facial feature triangles are processed in this manner. If the conditions in steps 186 and 188 are not met with those three triangles, then it is determined that the boundary box 141 contains no face.

The foregoing describes only some embodiments of the present invention, and modifications and/or changes can be made thereto without departing from the scope and spirit of the invention, the embodiment(s) being illustrative and not restrictive.

In the context of this specification, the word "comprising" means "including principally but not necessarily solely" or "having" or "including" and not "consisting only of". Variations of the word comprising, such as "comprise" and "comprises" have corresponding meanings.

I claim:

1. A method of detecting one or more human faces in a colour image, said method comprising the steps of:
   (a) forming human skin coloured segments in said colour image; and
   (b) determining for each segment whether said segment contains a face, said determining comprising the substeps of:
   (b1) identifying features in said segment;
   (b2) forming groups of said features; and
   (b3) for each group of said features, determining whether said group is bounded by contour lines in the shape of an ellipse, wherein only segments with at least one group of features bounded by contour lines in the shape of an ellipse contain a human face.

2. A method as claimed in claim 1, wherein step (a) comprises the sub-steps of:

(a1) over-segmenting said image into a plurality of first segments, each first segment having a substantially homogenous colour;
(a2) determining, for each first segment, a probability of colours contained therein being human skin colour;
(a3) merging adjacent first segments in which said probability is above a first predetermined threshold; and
(a4) grouping the merged first segments to form said human skin coloured segments.

3. A method as claimed in claim 2, wherein step (a2) comprises the sub-steps of:
(a2i) determining for each pixel of said image a probability of said pixel having a colour of human skin; and
(a2ii) calculating a mean of said probabilities of all pixels within said segment.

4. A method as claimed in claim 1 comprising the further steps of:
(c) determining for pixels in said image a measure of texture in a region of said pixel; and
(d) eliminating segments having said measure of texture above a second predetermined value from said human skin coloured segments.

5. A method as claimed in claim 4, wherein step (c) comprises the further steps of:
(c1) converting said image into a gray scale image;
(c2) determining for said grey scale image wavelet transforms for each of a third predetermined number of levels;
(c3) for at least one level of wavelet transforms, determining for each pixel in detail sub-images of said wavelet transform a variance of brightness intensities of pixels around said pixel to form a plurality of texture maps;
(c4) resizing each said texture map to the size of said image; and
(c5) determining a maximum pixel value of corresponding pixels in said resized texture maps, said maximum pixel value being said measure of texture of said pixel.

6. An apparatus for detecting one or more human faces in a colour image, said apparatus comprising:
means for forming human skin coloured segments in said colour image; and
means for determining for each segment whether said segment contains a face, said means for determining comprising:
means for identifying features in said segment;
means for forming groups of said features; and
means for determining for each group of said features whether said group is bounded by contour lines in the shape of an ellipse, wherein only segments with at least one group of features bounded by contour lines in the shape of an ellipse contain a human face.

7. An apparatus as claimed in claim 6, wherein said means for forming human skin coloured segments comprises:
means for over-segmenting said image into a plurality of first segments, each first segment having a substantially homogenous colour;
means for determining, for each first segment, a probability of colours contained therein being human skin colour;
means for merging adjacent first segments in which said probability is above a first predetermined threshold; and
means for grouping the merged first segments to form said human skin coloured segments.

8. An apparatus as claimed in claim 7, wherein said means for determining a probability comprises:

means for determining for each pixel of said image a probability of said pixel having a colour of human skin; and
means for calculating a mean of said probabilities of all pixels within said segment.

9. An apparatus as claimed in claim 6 further comprising:
means for detecting for pixels in said image a measure of texture in a region of said pixel; and
means for eliminating segments having said measure of texture above a second predetermined value from said human skin coloured segments.

10. An apparatus as claimed in claim 9, wherein said means for determining a measure of texture comprises:
means for converting said image into a grey scale image;
means for determining for said grey scale image wavelet transforms for each of a third predetermined number of levels;
means for, for at least one level of wavelet transforms, determining for each pixel in detail sub-images of said wavelet transform a variance of brightness intensities of pixels around said pixel to form a plurality of texture maps;
means for resizing each said texture map to the size of said image; and
means for determining a maximum pixel value of corresponding pixels in said resized texture maps, said maximum pixel value being said measure of texture of said pixel.

11. A program embodied in a computer-readable memory medium for controlling the operation of a data processing apparatus upon which the program executes to perform a method of detecting one or more human faces in a colour image, said method comprising the steps of:
forming human skin coloured segments in said colour image; and
determining for each segment whether said segment contains a face, the determining step comprising the sub-steps of:
identifying features in said segment;
forming groups of said features; and
determining for each group of said features whether said group is bounded by contour lines in the shape of an ellipse, wherein only segments with at least one group of features bounded by contour lines in the shape of an ellipse contain a human face.

12. A program as claimed in claim 11, wherein the step of forming human skin coloured segments comprises the sub-steps of:
over-segmenting said image into a plurality of first segments, each first segment having a substantially homogenous colour;
determining, for each first segment, a probability of colours contained therein being human skin colour;
merging adjacent first segments in which said probability is above a first predetermined threshold; and
grouping the merged first segments to form said human skin coloured segments.

13. A program as claimed in claim 12, wherein the step of determining a probability comprises the sub-steps of:
determining for each pixel of said image a probability of said pixel having a colour of human skin; and
calculating a mean of said probabilities of all pixels within said segment.

14. A program as claimed in claim 11, wherein the method further comprises the steps of:
determining for pixels in said image a measure of texture in a region of said pixel; and eliminating segments having said measure of texture above a second predetermined value from said human skin coloured segments.

15. A program as claimed in claim 14, wherein the step of determining a measure of texture comprises the sub-steps of:
converting said image into a grey scale image;
determining for said grey scale image wavelet transforms for each of a third predetermined number of levels;
for at least one level of wavelet transforms, determining for each pixel in detail sub-images of said wavelet transform a variance of brightness intensities of pixels around said pixel to form a plurality of texture maps;
for resizing each said texture map to the size of said image; and
for determining a maximum pixel value of corresponding pixels in said resized texture maps, said maximum pixel value being said measure of texture of said pixel.

* * * * *

UNITED STATES PATENT AND TRADEMARK OFFICE
CERTIFICATE OF CORRECTION

PATENT NO. : 7,035,456 B2
APPLICATION NO. : 10/157825
DATED : April 25, 2006
INVENTOR(S) : Fabrice Lestideau It is certified that error appears in the above-identified patent and that said Letters Patent is hereby corrected as shown below:

TITLE PAGE AT ITEM [56] RC:
Other Publications, "Numer." (1$^{st}$ occurrence) should be deleted.

TITLE PAGE AT ITEM [56] RC:
U.S. Patent Documents, "6,697,502 B1" should read --6,697,502 B2--; "6,718,049 B1" should read --6,718049 B2--; and "6,959,099 B1" should read --6,959,099 B2--.

TITLE PAGE AT ITEM [57] Abstract:
Line 6, "bounday" should read --boundary--.

COLUMN 3:
Line 46, "apparatus" should read --apparatus.--.

COLUMN 4:
Line 36, "IBM-PC's" should read --IBM-PCs--.

COLUMN 5:
Line 26, "face" should read --face.--.

COLUMN 6:
Line 40, "refer" should read --refers--.

COLUMN 7:
Line 45, " $|V_{ij}| = | V_i | | V_j |$ " should read --$|V_{ij}| = | V_i | + | V_j |$--.

COLUMN 8:
Line 17, "use," should read --used,--.

Line 22, " $D_M(z_i)=(z_i-\mu)\sum^{-1}(z_i-\mu)$ " should read -- $D_M(z_i)=(z_i-\mu).\sum^{-1}(z_i-\mu)$ '--.

Line 35, "inmplementation" should read --implementation--.

COLUMN 9:
Line 65, "locate" should read --located,--.
Line 67, "step 246" should read --step 246.--

COLUMN 10:
Line 1, "memory 706," should read --memory 706.--.
Line 3, "cause" should read --causes--
Line 56, "horizontal" should read --horizontal.--.

UNITED STATES PATENT AND TRADEMARK OFFICE
CERTIFICATE OF CORRECTION

PATENT NO. : 7,035,456 B2
APPLICATION NO. : 10/157825
DATED : April 25, 2006
INVENTOR(S) : Fabrice Lestideau It is certified that error appears in the above-identified patent and that said Letters Patent is hereby corrected as shown below:

COLUMN 11:
Line 4, "a" should read --an--.
Line 67, "map 258" should read --map 258.--.

COLUMN 12:
Line 30, "e" should read --e--.

Line 37, "$P = \sum_{i=1}^{5} \pi * P_l$" should read --$P = \sum_{i=1}^{5} \pi * P_i$--.

COLUMN 13:
Line 36, "triangles" should read --triangles.--.

COLUMN 14:
Line 23, "met" should read --met,--.

COLUMN 16:
Line 7, "detecting" should read --determining--.

Signed and Sealed this

Sixteenth Day of January, 2007

JON W. DUDAS
*Director of the United States Patent and Trademark Office*